(12) United States Patent
Ueda et al.

(10) Patent No.: US 8,250,442 B2
(45) Date of Patent: Aug. 21, 2012

(54) RECORDING METHOD AND REPRODUCTION METHOD SUITABLE FOR RECORDING/REPRODUCTION OF AV DATA, AND RECORDING DRIVE AND REPRODUCTION DRIVE, INFORMATION RECORDING SYSTEM AND INFORMATION REPRODUCTION SYSTEM, AND INFORMATION RECORDING MEDIUM FOR SUCH METHODS

(75) Inventors: Hiroshi Ueda, Hirakata (JP); Yoshiho Gotoh, Osaka (JP); Yoshihisa Fukushima, Osaka (JP); Motoshi Ito, Osaka (JP); Shinji Sasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 996 days.

(21) Appl. No.: 12/240,289

(22) Filed: Sep. 29, 2008

(65) Prior Publication Data

US 2009/0037790 A1    Feb. 5, 2009

Related U.S. Application Data

(60) Continuation of application No. 10/998,893, filed on Nov. 29, 2004, now abandoned, which is a division of application No. 09/491,143, filed on Jan. 26, 2000, now Pat. No. 6,842,580.

(30) Foreign Application Priority Data

Jan. 27, 1999  (JP) .................................... 11-019179

(51) Int. Cl.
*H03M 13/00* (2006.01)
(52) U.S. Cl. ..................................... 714/776
(58) Field of Classification Search .................. 714/776
See application file for complete search history.

(56) References Cited

U.S. PATENT DOCUMENTS

| 4,774,700 | A | 9/1988 | Satoh et al. | |
|---|---|---|---|---|
| 5,291,471 | A | 3/1994 | Russell | |
| 5,812,731 | A | 9/1998 | Sato et al. | |
| 6,282,365 | B1 * | 8/2001 | Gotoh et al. | 386/240 |
| 6,292,625 | B1 | 9/2001 | Gotoh et al. | |
| 6,842,580 | B1 * | 1/2005 | Ueda et al. | 386/248 |

FOREIGN PATENT DOCUMENTS

| EP | 0676761 | 9/1998 |
|---|---|---|
| EP | 0866456 | 9/1998 |
| WO | 98/14938 | 4/1998 |

OTHER PUBLICATIONS

Office Action dated Jun. 16, 2008 issued in the corresponding Japanese Application No. 2000-018094.
European Search Report, Application No. EP 00 10 1489, dated Apr. 18, 2000.

* cited by examiner

*Primary Examiner* — Guy Lamarre
(74) *Attorney, Agent, or Firm* — Renner, Otto, Boisselle & Sklar, LLP

(57) ABSTRACT

In an information recording medium for recording and reproducing data thereon on a sector-by-sector basis, the recorded data being managed as at least one file by using a file structure, the file structure includes unused space management information for identifying a used region and an unused region. At least one defective region is registered as an unused region in the unused space management information, the at least one defective region being a region on the information recording medium which is incapable of proper reproduction of the recorded data.

3 Claims, 27 Drawing Sheets

FIG. 6

SKIP WRITE command control block

|   | 7 | 6 | 5 | 4 | 3 | 2 | 1 | 0 |
|---|---|---|---|---|---|---|---|---|
| 0 | SKIP WRITE instruction code ||||||||
| 1 | Reserved ||||||||
| 2 | Logic sector number ||||||||
| 3 |  ||||||||
| 4 |  ||||||||
| 5 |  ||||||||
| 6 | Allowable number of skipped blocks ||||||||
| 7 | Transfer length ||||||||
| 8 |  ||||||||
| 9 | Reserved ||||||||
| 10 |  ||||||||
| 11 |  ||||||||

FIG. 7

READ SKIPPED ADDRESS command control block

|   | 7 | 6 | 5 | 4 | 3 | 2 | 1 | 0 |
|---|---|---|---|---|---|---|---|---|
| 0 | READ SKIPPED ADDRESS instruction code ||||||||
| 1 | Reserved ||||||||
| 2 |  ||||||||
| 3 |  ||||||||
| 4 |  ||||||||
| 5 |  ||||||||
| 6 |  ||||||||
| 7 | Allocated length ||||||||
| 8 |  ||||||||
| 9 | Reserved ||||||||
| 10 |  ||||||||
| 11 |  ||||||||

FIG.8

Skipped address data format

| | 7 | 6 | 5 | 4 | 3 | 2 | 1 | 0 | |
|---|---|---|---|---|---|---|---|---|---|
| 0–1 | Skipped address number ||||||||  — 801 |
| 2–5 | Skipped address #1 (LSN) |||||||| |
| 6–9 | Skipped address #2 (LSN) |||||||| |
| | ⋮ |||||||| |
| (4n−2)–(4n+1) | Skipped address #n (LSN) |||||||| |

802 brackets the rows from 2–5 through (4n−2)–(4n+1).

FIG.11

SET READ AV AREA command control block

| | 7 | 6 | 5 | 4 | 3 | 2 | 1 | 0 |
|---|---|---|---|---|---|---|---|---|
| 0 | SET READ AV AREA instruction code ||||||||
| 1 | Reserved ||||||||
| 2 | ||||||||
| 3 | ||||||||
| 4 | ||||||||
| 5 | ||||||||
| 6 | ||||||||
| 7 | Transfer data length ||||||||
| 8 | ||||||||
| 9 | Reserved ||||||||
| 10 | ||||||||
| 11 | ||||||||

FIG.12

SET READ AV AREA data format

| | 7 | 6 | 5 | 4 | 3 | 2 | 1 | 0 | |
|---|---|---|---|---|---|---|---|---|---|
| 0 | AV AREA number |||||||| ~1201 |
| 1 | Reserved |||||||| |
| 2-5 | Region #1 start LSN |||||||| ⎫ 1202 |
| 6-9 | Region #1 end LSN |||||||| ⎭ |
| ... | |||||||| ⎬ 1203 |
| (8n-6)-(8n-3) | Region #n start LSN |||||||| ⎫ 1202 |
| (8n-2)-(8n+1) | Region #n end LSN |||||||| ⎭ |

FIG.13

READ AV command control block

| | 7 | 6 | 5 | 4 | 3 | 2 | 1 | 0 |
|---|---|---|---|---|---|---|---|---|
| 0 | READ AV instruction code ||||||||
| 1 | Reserved ||||||||
| 2 | LSN to start reading from ||||||||
| 3 | ||||||||
| 4 | ||||||||
| 5 | ||||||||
| 6 | Reserved ||||||||
| 7 | Transfer data length ||||||||
| 8 | ||||||||
| 9-11 | Reserved ||||||||

FIG.18

SET RECORD AREA command control block — 1800

| | 7 | 6 | 5 | 4 | 3 | 2 | 1 | 0 | |
|---|---|---|---|---|---|---|---|---|---|
| 0 | SET RECORD AREA instruction code ||||||||— 1801 |
| 1 | Reserved |||||||| |
| 2 | First LSN of recording region |||||||| — 1802 |
| 3 | |||||||| |
| 4 | |||||||| |
| 5 | |||||||| |
| 6 | Last LSN of recording region |||||||| — 1803 |
| 7 | |||||||| |
| 8 | |||||||| |
| 9 | |||||||| |
| 10 | Reserved |||||||| |
| 11 | |||||||| |

FIG.19

WRITE AV command control block — 1900

| | 7 | 6 | 5 | 4 | 3 | 2 | 1 | 0 | |
|---|---|---|---|---|---|---|---|---|---|
| 0 | WRITE AV instruction code ||||||||— 1901 |
| 1 | Reserved |||||||| |
| 2 | |||||||| |
| 3 | |||||||| |
| 4 | |||||||| |
| 5 | |||||||| |
| 6 | |||||||| |
| 7 | Transfer length ||||||||— 1902 |
| 8 | |||||||| |
| 9 | Reserved |||||||| |
| 10 | |||||||| |
| 11 | |||||||| |

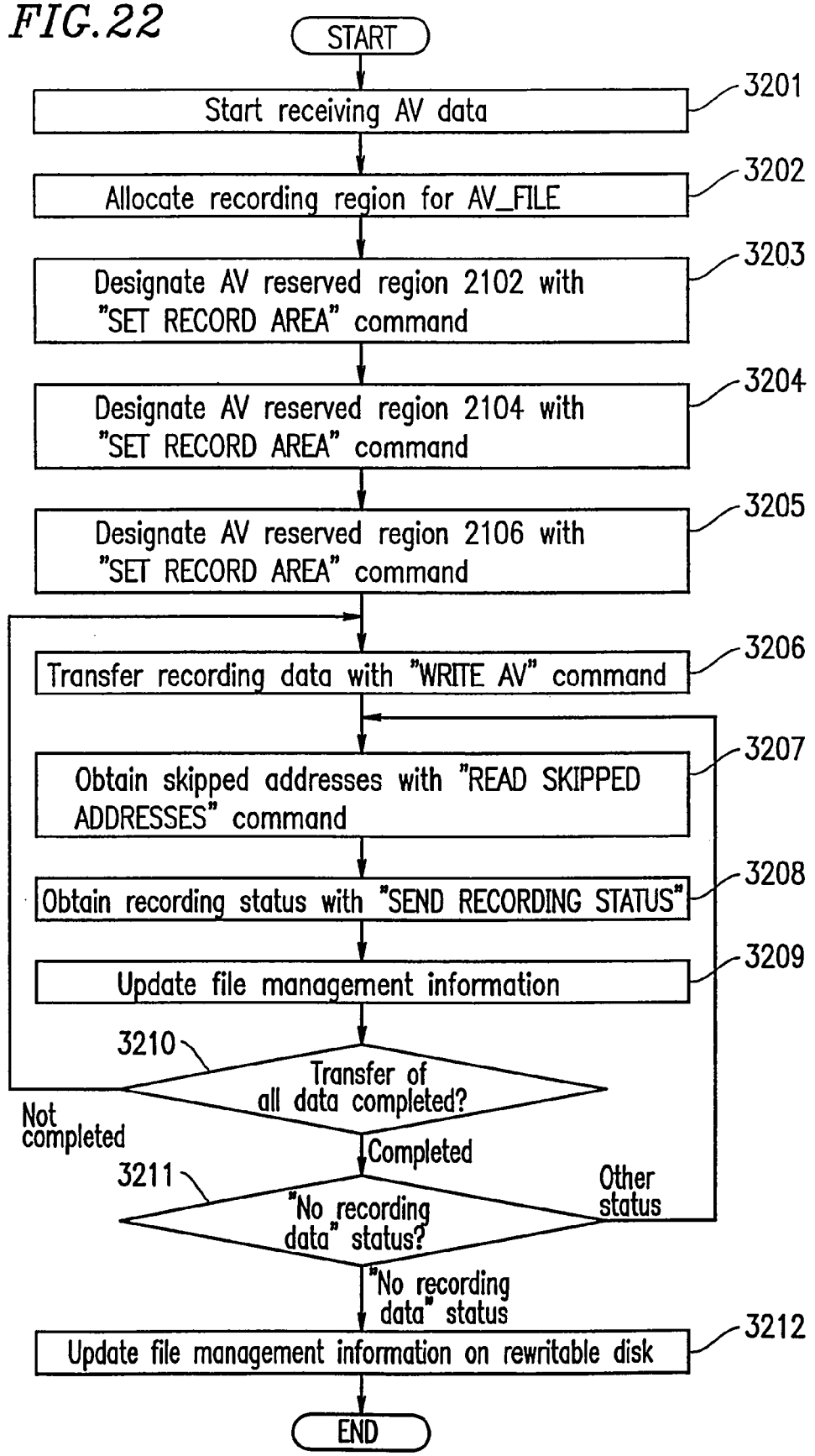

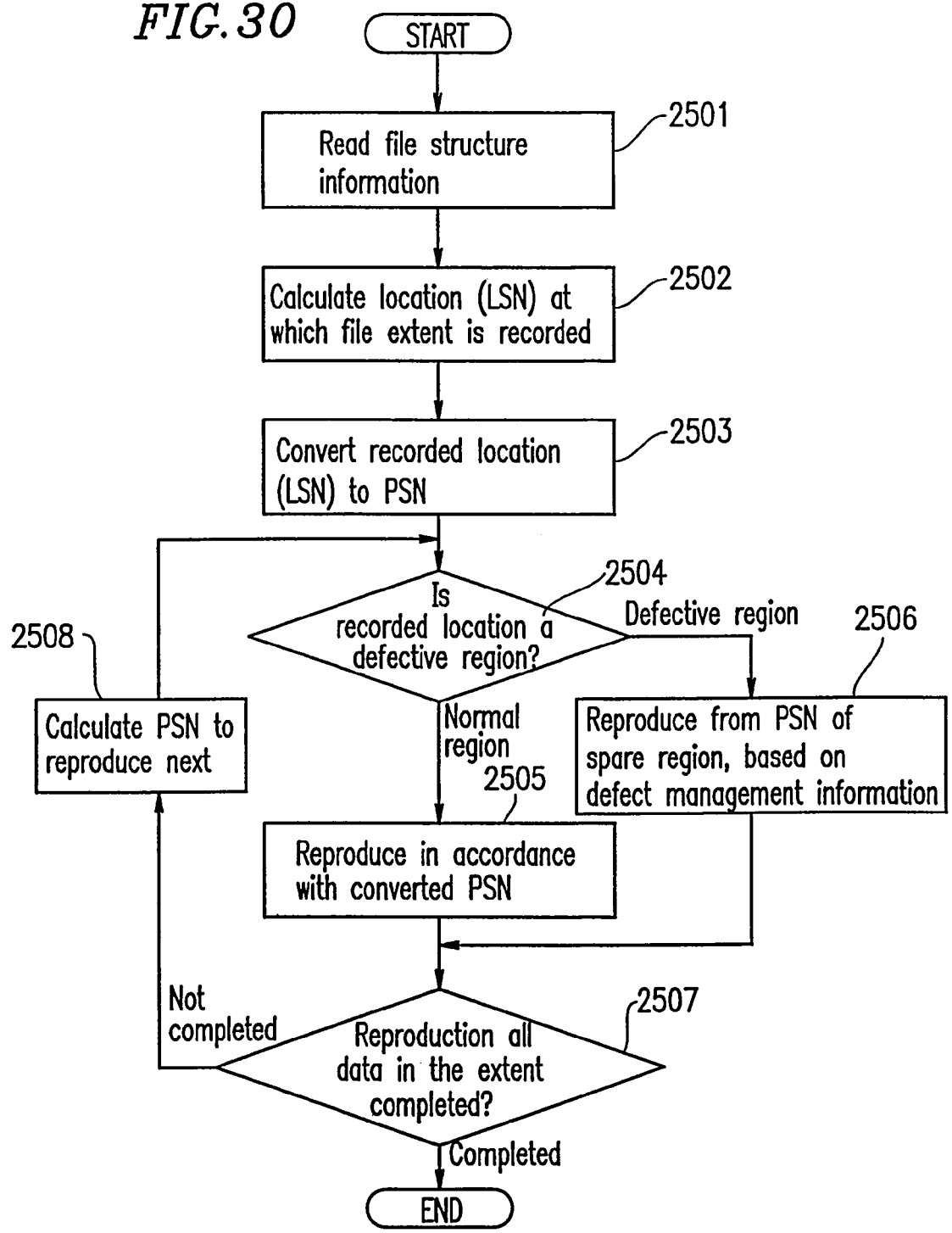

RECORDING METHOD AND REPRODUCTION METHOD SUITABLE FOR RECORDING/REPRODUCTION OF AV DATA, AND RECORDING DRIVE AND REPRODUCTION DRIVE, INFORMATION RECORDING SYSTEM AND INFORMATION REPRODUCTION SYSTEM, AND INFORMATION RECORDING MEDIUM FOR SUCH METHODS

This application is a continuation of U.S. application Ser. No. 10/998,893 filed Nov. 29, 2004 now abandoned, which is a divisional of U.S. application Ser. No. 09/491,143 filed Jan. 26, 2000, now U.S. Pat. No. 6,842,580 issued Jan. 11, 2005, which claimed priority under 35 U.S.C. §119(a) of Japanese Patent Application No. 11-19179 filed on Jan. 27, 1999, the entire disclosure of which is incorporated herein by reference and is related to co-pending sibling U.S. application No. 12/240,225 filed on Sep. 29, 2008.

BACKGROUND OF THE INVENTION

1. Field of the Invention

The present invention relates to a method for recording/reproducing information on an information recording medium. In particular, the present invention relates to a technique for achieving real-time recording/reproduction of video and/or audio data on an information recording medium including a defective region.

2. Description of the Related Art

Optical disks are representative of information recording media having a sector structure. The trend for higher density and larger capacity in recent years has underlined the importance of the reliability of such disks. If a disk includes a sector in which information cannot be properly recorded or reproduced, such a sector is typically registered as a "defective sector" by an optical disk apparatus so that the defective sector will not be used thereafter, and another sector is substituted for that defective sector. This ensures reliability of the disk. Such a defect management function performed by optical disk apparatuses is described in the International Standards Organization ISO/IEC10090 (hereinafter referred to as the "ISO standards") for 90 mm optical disks.

FIG. 25 is a diagram illustrating the structure of a general disk medium.

The disk medium 1 includes a number of concentric or spiral tracks 2 formed thereon, each track 2 including a number of subdivisions which are referred to as sectors 3. The disk includes two types of regions: disk information areas 4 and a data recording area 5. The disk information areas 4, which store parameters and the like that are necessary for making access to the disk, are positioned at the innermost periphery and the outermost periphery of the disk medium 1.

The disk information areas 4 may also be referred to as lead-in and lead-out areas, respectively. The recording/reproduction of data is performed for the data recording area 5. Every sector in the data recording area 5 receives an absolute address which is referred to as a physical sector number (hereinafter "PSN").

FIG. 26 illustrates the data structure (denoted as 2600) of a conventional disk medium. The data structure 2600 illustrates a case where, as shown in FIG. 27, the disk medium includes a directory DIR1 under a directory ROOT, and the directory DIR1 includes two files FILE1 and FILE2.

The data structure 2600 includes unused space management information 2601, a data structure 2602 representing the logical space on the disk medium 1, a data structure 2603 representing the physical space on the disk medium 1, and defect management information 2604. The physical space data structure 2603 includes a control data area 2605, defect management information 2606, and an unused spare area 2607, which are to be interpreted only by a reproduction apparatus (e.g., an optical disk drive) for physically reproducing data on the disk medium 1 and which are inaccessible to a control apparatus (e.g., a personal computer). Note that these areas are not included in the logical space data structure 2602.

As shown in FIG. 26, the logical space is divided into a volume structure 2608 for storing logical volume structure information and a region (partition space) 2609 for storing the file structure and file data in the logical volume space. The respective divisions of the logical space are managed based on their consecutive addresses which are referred to as logical sector number (hereinafter "LSN").

Hereinafter, the respective contents which are stored in the partition space 2609 will be described.

The unused space management information 2601 is a bit map which represents whether each sector within the partition space 2609 is used or not. Each bit on the bit map corresponds to a sector. The bit value "1" indicates "used", whereas the bit value "0" indicates "unused". In the example shown in FIG. 26, the unused space management information 2610 and the ROOT directory file structure 2611 always have the "0" bit value on the bit map, whereas all the other regions, except for an unused region 2612, have the "1" bit value on the bit map.

The ROOT directory file structure 2611 includes a ROOT directory file (not shown in the figure) for storing information concerning the files and/or directories which are under the ROOT directory, and a ROOT ICB (not shown in the figure) for specifying a position at which the ROOT directory file is recorded.

A DIR1 file entry 2613 includes the location information of a DIR1 directory file 2614. The DIR1 directory file 2614 stores information concerning the directories and files which are in the directory DIR1.

The DIR1 directory file 2614 includes information concerning the files FILE1 and FILE2 stored in the directory DIR1, and the location information of a FILE1 file entry 2615 and a FILE2 file entry 2616.

The FILE1 file entry 2615 and the FILE2 file entry 2616 include the location information of the file data of the files FILE1 and FILE2, respectively, and the like.

The FILE1 extent 2617 contains the file data of the file FILE1. The FILE2 extent 2618 contains the file data of the file FILE2.

Next, the physical space data structure 2603 will be described.

The physical space on the disk is generally divided into a disk information area 2619 and a data recording area 2620. The disk information area 2619 stores control information which is referred to only by a reproduction apparatus (e.g., an optical disk drive) for physically reproducing data on the disk medium 1 and is inaccessible to a control apparatus (e.g., a personal computer).

The disk information area 2619 is generally divided into a control data area 2605 and defect management information 2606. The control data area 2605 stores control information such as disk identification information and copyright protection information. The defect management information 2606 stores information concerning any defects on the disk. The defect management information 2606 will be described later in detail.

The data recording area 2620 includes a user area 2621 for recording file structures and file data, and a spare area 2622 for complementing any defective regions which may be present in the user area. A defective region 2623 included within the user area 2621 can be substituted for by a spare region 2624 in the spare area 2622. Similarly, a defective region 2625 included within the user area 2621 can be substituted for by a spare region 2626 in the spare area 2622.

Next, the relationship between the logical space 2602 and the physical space 2603 will be described. If no defective regions are present in the physical space 2603 on the disk, the user area 2621 corresponds to the logical space 2602 for each group. In the example illustrated in FIG. 26, it will be seen that the volume structure 2608, the unused space management information 2610, the ROOT directory file structure 2611, the DIR1 file entry 2613, the DIR1 directory file 2614, the FILE1 file entry 2615, and the FILE2 file entry 2616 in the logical space 2602 correspond to their respective counterparts in the physical space 2603. However, if the physical space 2603 includes any defective regions (e.g., 2623 and 2625), such defective regions (2623 and 2625) can be substituted for by spare regions (e.g., 2624 and 2626) within the spare area 2622. For example, the FILE1 extent region 2617 in the physical space 2603 includes the defective region 2623 in the example illustrated in FIG. 26. Since the defective region 2623 cannot be used, the defective region 2623 is substituted for by the spare region 2624, thereby providing an error-free logical space 2602. As a result, the FILE1 extent 2617 is allocated as one continuous space within the logical space 2602. The same applies to the defective region 2625 in the FILE2 extent 2618 within the physical space 2603.

The defective regions (e.g., 2623 and 2625) and the spare regions (e.g., 2624 and 2626) are managed by the defect management information 2606 within the disk information area 2619. A disk definition structure 2627 of the defect management information 2604 stores information such as a defect management method for the disk and disk attributes. A primary defect list (hereinafter "PDL") 2628 usually stores the location information of defective regions which are detected during an initialization process performed by a disk manufacturer. Any defective regions which are detected during the use by a user are handled by a secondary defect list (hereinafter "SDL") 2632. The SDL 2632 includes a secondary defect list header 2629 for storing the number of updates made to the defect management information 2606, a secondary defect list registration number 2630 for indicating the number of pairs of defective regions and corresponding spare regions that are registered in the list ("2" is set in the example illustrated in FIG. 26), and a list 2631 of the PSNs of the defective regions and the PSNs of their corresponding spare regions as arranged in the ascending order of the PSNs of the defective regions. Thus, a recording/reproduction apparatus for the disk reads the defect management information 2604 during a start-up process which is performed upon insertion of the disk, and may access the spare regions, instead of any defective regions, in a subsequent disk access.

Next, a conventional method for performing a recording process for the disk will be described with reference to a flowchart shown in FIG. 28. The recording process can be generally divided into two portions: a file data recording process from Steps 2301 to 2309 and a file structure recording process from Steps 2310 to 2317.

(1) File Data Recording Process

A disk recording apparatus (not shown in the figure) first performs a region allocation Step 2301 for selecting or allocating a location, from within the unused region on the disk, for recording a file. Specifically, a region for recording a file is selected from among the unused regions (which are indicated by the "0" bit value on the aforementioned bit map) in the unused space management information 2601 (FIG. 26). Thus, Step 2301 determines the location of a file to be recorded on the disk. It is assumed that the unused space management information 2601 has previously been read from the disk medium.

Next, at Step 2302, the disk recording apparatus begins recording file data at the recording location which was determined at Step 2301. When performing an actual writing to the disk, an error determination step 2303 checks whether or not a physical address (i.e., location identification information recorded in the form of convexities and concavities on the disk) has been read properly. This check is performed because a sector address must be read before writing data in any given sector. If the sector address which has been read includes an error, the recording cannot occur properly because of inability to identify the right location. If the error determination step 2303 determines that an address read error has occurred, the region associated with the error is defined as a defective region, and an replacement step 2308 is performed.

Next, a verification step 2304 is performed for verifying whether or not a write operation was successfully performed. Specifically, the confirmation of a successful write operation at the verification step 2304 involves reading data from the region for which the write operation was performed, comparing the read data against the data which was intended to be written, calculations associated with error correction codes, and the like.

After the verification step 2304, it is determined at Step 2305 whether or not the data includes an error. If the data includes an error, the region associated with the error is defined as a defective region, and an replacement step 2309 is performed.

If the error determination step 2305 determines no error, it is determined at Step 2306 whether or not all of the data to be recorded has been recorded. If less than all of the data to be recorded has been recorded, a next recording address is set at Step 2307, followed by a data write operation 2302 and a verification step 2304.

The above steps are repeated until all the data to be recorded have been recorded without errors. Thereafter, a file structure recording process is performed.

Note that the replacement steps 2308 and 2309 each involve a process for replacing a defective region with a spare area (e.g., 2622) shown in FIG. 26.

FIG. 29 is a flowchart showing the replacement operation to be performed at the replacement step 2308 or 2309 during recording. At Step 2401, a spare region 2624 or 2626 for substituting for a defective region 2623 or 2625 is allocated from within the spare area 2622 shown in FIG. 26. As a result, at Step 2402, the data which would otherwise have been recorded in the defective region 2623 or 2625 is written in the spare region 2624 or 2626. Thereafter, an error determination step 2403 is performed so as to check whether or not a physical address has been read properly, in a manner similar to Step 2303 described with reference to FIG. 28. If it is determined that the address which has been read includes an error, Steps 2401 and 2402 are performed so as to the perform recording in another spare region. If the write operation is normally ended, a verification step 2404 is performed for verifying whether or not a write operation was successfully performed. Specifically, the confirmation of a successful write operation at the verification step 2404 involves reading data from the region for which the write operation was performed, comparing the read data against the data which was intended to be written, calculations associated with error correction codes, and the like. After the verification step 2404, it is determined at Step 2405 whether or not the data includes an error. If the data includes an error, Step 2401 is again performed to allocate yet another spare region. If the error determination step 2405 determines no error, an SDL registration step 2406 is performed which registers the PSN of the defective region and the PSN of the corresponding spare region on the SDL, and increments the SDL entry number by 1.

(2) File Structure Recording Process

After the file data recording process as described in (1) above is completed, a file structure recording process is performed so as to accommodate any changes in the file data recording locations and any updates made to the size information. The actual file structure recording process is similar to the aforementioned process from Steps 2301 to 2309 except for handling different data contents and recording areas. Specifically, a write operation for the file structure (Step 2310), an address read error determination (Step 2311), a verification (Step 2312), and a verification error determination (Step 2313) are repeated, each time setting a next address (Step 2315), until the process is terminated as a data end is determined (Step 2314).

The replacement processes (Steps 2316 and 2317) which are performed in the case where an error is determined in the error determination Steps (2311 and 2313, respectively) are similar to the replacement step 2308 or 2309 for the aforementioned file data recording process, which have been described with reference to FIG. 29.

(3) Data Reproduction

Next, the operation of reading data which has been recorded in accordance with the recording method illustrated in FIGS. 28 and 29 will be described with reference to FIG. 30. Specifically, FIG. 30 is a flowchart illustrating the operation of reproducing one extent (as part of the file data of the files recorded on a disk). Hereinafter, the respective steps of this process will be described.

Prior to reproduction, a disk reproduction apparatus (not shown in the figure) reads the file structure information at Step 2501. Next, at Step 2502, the file structure which was read at Step 2501 is interpreted so as to obtain therefrom an LSN at which the file data of a file to be reproduced is recorded, as well as the size of that file. Thereafter, at Step 2503, the LSN is converted into a PSN, which is set as a read location. At Step 2504, it is determined whether or not the read location expressed by its PSN has been registered as a defective region PSN on the SDL in the defect management information 2604. If the read location is registered on the SDL as a defective region PSN, the reproduction apparatus calculates the PSN of a spare region which corresponds to the defective region from the SDL, and performs a reproduction process for the spare region at Step 2506. If the read location is not registered as a defective region PSN on the SDL, at Step 2505, the reproduction apparatus performs a reproduction process for the PSN as obtained through the conversion at Step 2503. After the reproduction step 2505 or 2506, the reproduction apparatus determines whether or not all data of the extent which is currently subjected to reproduction has been in fact reproduced at Step 2507. If the reproduction of all of the data is not complete, at Step 2508, a PSN to be reproduced next is set to an address which is obtained by adding the size of data which has been reproduced to the PSN obtained through the aforementioned conversion at Step 2503, and the reproduction process from Step 2504 is repeated. If it is determined at step 2507 that the reproduction of all data of the extent in question is complete, the process is terminated.

However, according to the above-described conventional technique, if the defective region 2623 exists in the FILE1 extent in the data arrangement as shown in FIG. 26, the corresponding spare region 2624 which is allocated within the spare area 2622 will require a seek operation to occur over a considerable distance. For example, in order to continuously reproduce all of the FILE1 extent, portions of the FILE1 extent that are in the user area 2621 are first reproduced. Then, upon encountering the defective region 2623, a seek for the spare area 2622 and a concomitant rotation wait period must occur before the access to the spare region 2624 becomes possible. Similarly, after an access is made to the spare region 2624, a seek from the spare region 2624 back to a region lying subsequent to the defective region 2623 and a concomitant rotation wait period must occur before the access to the remainder of the FILE 1 extent becomes possible. The same also applies to any defective region 2625 in the FILE2 extent.

Thus, a significant delay occurs during a recording or reproduction process if any defective regions (e.g., 2623 or 2625) exist in the user area 2621. It is presumable that such delay may not be critically problematic in the case of disks which are utilized as large-capacity storage media for traditional computer applications. However, such delay may well be critically problematic in real-time recording and/or smooth reproduction of data containing digital video and audio data (hereinafter referred to as "AV data"). For example, problems such as partial loss of AV data, noise generation, inability to perform smooth reproduction, may occur.

SUMMARY OF THE INVENTION

In one aspect of the present invention, there is provided an information recording medium for recording and reproducing data thereon on a sector-by-sector basis, the recorded data being managed as at least one file by using a file structure, wherein the file structure includes unused space management information for identifying a used region and an unused region, and wherein at least one defective region is registered as an unused region in the unused space management information, the at least one defective region being a region on the information recording medium which is incapable of proper reproduction of the recorded data.

In one embodiment of the invention, the at least one defective region is a region in which a physical address representing location information on the information recording medium cannot be properly read.

In another embodiment of the invention, the at least one defective region is a region which is determined, in a verification operation performed subsequent to recording of the data, as not having the data properly recorded.

In still another embodiment of the invention, the information recording medium includes ECC blocks as units for performing an error correction process, each ECC block including a plurality of sectors, and the at least one defective region is managed on an ECC block-by-ECC block basis.

Alternatively, there is provided an information recording medium for recording and reproducing data thereon on a sector-by-sector basis, including ECC blocks as units for performing an error correction process, each ECC block including a plurality of sectors, wherein at least one sector having data recorded therein is managed as an extent, and at least one extent is managed as a file, at least one file being managed by using a file structure, and wherein, in a case where data which is not large enough to fill one ECC block exists in the at least one file, an unused region of the one ECC block is managed as a padding extent, thereby indicating that the unused region of the one ECC block is an allocated but unused portion of the at least one file.

In one embodiment of the invention, an extent type is registered in file management information in a one-to-one relationship with the at least one extent, the extent type being identification information for identifying the padding extent.

Alternatively, there is provided an information recording medium for recording and reproducing data thereon on a sector-by-sector basis, the recorded data being managed as at least one file by using a file structure, wherein, for each of the at least one file, the file structure includes an AV flag, the AV flag being identification information for identifying an AV file containing at least one of video information and audio information.

In another aspect of the present invention, there is provided an information recording method for recording data on an information recording medium for recording and reproducing data on a sector-by-sector basis, the recorded data being managed as at least one file by using a file structure, the method including: a recording region allocation step for allocating a recording region for recording the data; a skip recording step for recording the data in the recording region allocated during the recording region allocation step while skipping a defective region in the recording region allocated during the recording region allocation step; and a file management information generation step for registering a portion of the recording region in which the data was recorded without skipping, as an extent in file management information, registering the portion as an used region in unused space management information, and registering the skipped defective region as an unused region in the unused space management information.

In one embodiment of the invention, the information recording method includes: a file data attribute determination step for determining data attribute of the at least one file to be recorded; and a replacement recording step for recording the data while replacing the defective region within the recording region allocated during the recording region allocation step with a non-defective region, wherein recording of the data occurs in the skip recording step if the file data attribute determination step determines the data attribute of the at least one file to be recorded as indicating an AV file containing at least one of video information and audio information as opposed to a non-AV file, or occurs in the replacement recording step if the file data attribute determination step determines the data attribute of the at least one file to be recorded as indicating a non-AV file.

In another embodiment of the invention, the skip recording step includes a data verification step for checking whether or not the recorded data is properly recorded, and the defective region includes a region having been determined as containing an error during the data verification step.

In still another embodiment of the invention, the information recording medium includes ECC blocks as units for performing an error correction process, each ECC block including a plurality of sectors, wherein the skip recording step skips the defective region on an ECC block-by-ECC block basis, and wherein the file management information generation step registers the defective region in the unused space management information on an ECC block-by-ECC block basis.

In still another embodiment of the invention, the recording region allocation step includes an allowable skip number calculation step for calculating an allowable skip number, the allowable skip number representing a maximum number of skips that can be made while allowing the data to be entirely recorded within the recording region allocated during the recording region allocation step, wherein the skip recording step includes a skip recording instructing step for requesting recording to be begun, while designating the calculated allowable skip number and location information of the recording region allocated during the recording region allocation step, wherein the file management information generation step includes a recording location information transfer step for transferring recording location information representing a location of a portion of the recording region in which the data was recorded without skipping during the skip recording step, and wherein the file management information generation step generates file management information based on the recording location information which was transferred during the recording location information transfer step.

In still another embodiment of the invention, the skip recording step includes: a recording region designation step for designating the recording region allocated during the recording region allocation step, and a split recording step for recording the data in the recording region in a split manner, wherein the file management information generation step includes a recording location information transfer step for transferring recording location information representing a location of a portion of the recording region in which the data was recorded without skipping during the skip recording step, and wherein the file management information generation step generates file management information based on the recording location information which was transferred during the recording location information transfer step.

In still another embodiment of the invention, the skip recording step includes: a recording region designation step for designating the recording region allocated during the recording region allocation step, and a split recording step for recording the data in the recording region in a split manner, and a recording status confirmation step for obtaining location information and a recording status as associated with progress of the recording.

Alternatively, there is provided an information recording method for recording the data on an information recording medium for recording and reproducing data thereon on a sector-by-sector basis, including ECC blocks as units for performing an error correction process, each ECC block including a plurality of sectors, wherein at least one sector having data recorded therein is managed as an extent, and at least one extent is managed as a file, at least one file being managed by using a file structure, the method including: a recording region allocation step for allocating a recording region for recording the data; a skip recording step for recording the data in the recording region allocated during the recording region allocation step while skipping a defective region in the recording region allocated during the recording region allocation step; and a file management information generation step for registering a portion of the recording region in which the data was recorded without skipping, as an extent in file management information, registering the portion as an used region in unused space management information, and registering the skipped defective region as an unused region in the unused space management information, wherein, in a case where an end of an extent falls in the middle of one of the ECC blocks, a remaining portion of the one ECC block is registered as a padding extent in the file management information, thereby indicating that the remaining portion of the one ECC block is an allocated but unused portion of the at least one file.

Alternatively, there is provided information recording method for recording the data on an information recording medium for recording and reproducing data thereon on a sector-by-sector basis, wherein at least one sector having data recorded therein is managed as an extent, and at least one extent is managed as a file, at least one file being managed by using a file structure, the method including: a recording region allocation step for allocating a recording region for recording the data; a skip recording step for recording the data in the recording region allocated during the recording region allocation step while skipping a defective region in the recording region allocated during the recording region allocation step; and a file management information generation step for registering a portion of the recording region in which the data was recorded without skipping, as an extent in file management information, registering the portion as an used region in unused space management information, and registering the skipped defective region as an unused region in the unused space management information, wherein, the file management information generation step includes an AV file attribute registration step for, if the recorded file is an AV file containing at least one of video information and audio information, registering file attribute information for identifying the AV file in the file management information.

In another aspect of the present invention, there is provided a disk recording drive for recording data on a disk for recording and reproducing data on a sector-by-sector basis, the disk recording drive including: an instruction processing section for processing processing requests; and a disk recording control section for controlling a recording process for the disk in accordance with a request from the instruction processing section, wherein the instruction processing section includes: a skip recording instruction processing section for receiving a skip recording instruction and requesting the disk recording control section to perform recording, the skip recording instruction including a recording start location, a recording length, and an allowable skip number; and a recording location requesting instruction processing section for receiving recording location information of the recorded data from the disk recording control section and reporting the recording location information, and wherein the disk recording control section includes: a recording control information memory for storing recording control information upon receiving the skip recording instruction, the recording control information including the recording start location, the recording length, and the allowable skip number; a defective region detection section for detecting a defective region on the disk during a recording operation; a skip recording control section for beginning a recording operation in accordance with the recording control information stored in the recording control information memory, wherein, in a case where a defective region is detected by the defective region detection section during the recording operation, the skip recording control section i) stops recording in the defective region and records a remainder of the data in a subsequent region, the remainder of the data including the data which would otherwise have been recorded in the defective region, if the number of defective regions is equal to or smaller than the allowable skip number, or ii) terminates the recording operation and reports an error to the skip recording instruction processing section, if the number of defective regions is larger than the allowable skip number; and a defective region recording location storing memory for storing location information of the defective region skipped by the skip recording control section.

In one embodiment of the invention, the disk recording control section further includes a data verification section for reading and checking the data from a recorded region, and the defective region includes a region which is determined by the data verification section as containing an error.

In still another embodiment of the invention, the skip recording control section determines the defective region on an ECC block-by-ECC block basis, in a case where the disk includes ECC blocks as units for performing an error correction process, each ECC block including a plurality of sectors.

Alternatively, there is provided a disk recording drive for recording data on a disk for recording and reproducing data on a sector-by-sector basis, the disk recording drive including: an instruction processing section for processing processing requests; and a disk recording control section for controlling a recording process for the disk in accordance with a request from the instruction processing section, wherein the instruction processing section includes: a recording region designation instruction processing section for processing a recording region designation instruction which designates location information of a recordable region; a split recording instruction processing section for processing a split recording instruction which instructs transferring data to be recorded in a recording region designated by the recording region designation instruction, the data being transferred in a split manner; and a recording location requesting instruction processing section for reporting recording location information of the recorded data, and wherein the disk recording control section includes: a recording control information memory for storing location information of the recording region designated by the recording region designation instruction, as recording control information; a defective region detection section for detecting a defective region on the disk during a recording operation; a skip recording control section for beginning a recording operation in accordance with the recording control information stored in the recording control information memory, wherein, in a case where a defective region is detected by the defective region detection section during the recording operation, the skip recording control section i) stops recording in the defective region and records a remainder of the data in a subsequent region, the remainder of the data including the data which would otherwise have been recorded in the defective region, if the recording location information indicates a location within the recording region as stored in the recording control information memory, or ii) terminates the recording operation and reports an error to the split recording instruction processing section, if the recording location information indicates a location past the recording region as stored in the recording control information memory; and a defective region recording location storing memory for storing location information of the defective region skipped by the skip recording control section.

In one embodiment of the invention, the disk recording control section further includes a data verification section for reading and checking the data from a recorded region, and the defective region includes a region which is determined by the data verification section as containing an error.

In another embodiment of the invention, the skip recording control section determines an ECC block including the defective region as a defective region, in a case where the disk includes ECC blocks as units for performing an error correction process, each ECC block including a plurality of sectors.

In still another embodiment of the invention, the instruction processing section further includes a recording status reporting instruction processing section for receiving a recording status reporting instruction and reporting a current recording location and a current recording status.

In another aspect of the present invention, there is provided a data recording method for recording data on a disk for recording and reproducing data on a sector-by-sector basis, the disk recording method including: an instruction processing step for processing processing requests; and a disk recording control step for controlling a recording process for the disk, wherein the instruction processing step includes: a recording region designation instruction processing step for processing a recording region designation instruction which designates location information of a recordable region; a split recording instruction processing step for processing a split recording instruction which instructs transferring data to be recorded in a recording region designated by the recording region designation instruction, the data being transferred in a split manner; and a recording location requesting instruction processing step for reporting recording location information of the recorded data, and wherein the disk recording control step includes: a recording control information storing step for storing location information of the recording region designated during the recording region designation step as recording control information; a defective region detection step for detecting a defective region on the disk during a recording operation; a skip recording control step for beginning a recording operation in accordance with the recording control information stored during the recording control information storing step, wherein, in a case where a defective region is detected by the defective region detection step during the recording operation, the skip recording control step i) stops recording in the defective region and records a remainder of the data in a subsequent region, the remainder of the data including the data which would otherwise have been recorded in the defective region, if the recording location information indicates a location within the recording region as stored during the recording control information storing step, or ii) terminates the recording operation and reports an error to the split recording instruction processing step, if the recording location information indicates a location past the recording region as stored during the recording control information storing step; and a defective region recording location storing step for storing location information of the defective region skipped by the skip recording control step.

In one embodiment of the invention, the disk recording control step further includes a data verification step for reading and checking the data from a recorded region, and the defective region includes a region which is determined by the data verification step as containing an error.

In another embodiment of the invention, the skip recording control step determines an ECC block including the defective region as a defective region, in a case where the disk includes ECC blocks as units for performing an error correction process, each ECC block including a plurality of sectors.

In still another embodiment of the invention, herein the instruction processing step further includes a recording status reporting instruction processing step for receiving a recording status reporting instruction and reporting a current recording location and a current recording status.

In another aspect of the present invention, there is provided an information recording system including an upper control apparatus and the aforementioned disk recording drive, wherein the upper control apparatus includes: an instruction issuing section for issuing an instruction to the disk recording drive, a recording region allocation section for allocating a recording region for recording the data; and a file management information generation section for generating file management information for managing the at least one file recorded on the disk, wherein the instruction issuing section includes: a skip recording instruction issuing section for issuing a skip recording instruction for recording the data in the recording region allocated by the recording region allocation section while skipping a defective region in the recording region allocated by the recording region allocation section; and a recording location requesting instruction issuing section for issuing a recording location requesting instruction for requesting transfer of recording location information of a recorded region, and wherein the file management information generation section generates file management information based on the recording location information received by the recording location requesting instruction issuing section from the disk recording drive.

In one embodiment of the invention, if the recorded file is an AV file containing at least one of video information and audio information, the file management information generation section registers information for identifying the AV file in file attribute information.

In another embodiment of the invention, the file management information generation section registers a defective region detected during the recording operation as an unused region in unused space management information, the unused space management information being comprised in the file management information.

Alternatively, there is provided an information recording system including an upper control apparatus and the aforementioned disk recording drive, wherein the upper control apparatus includes: an instruction issuing section for issuing an instruction to the disk recording drive, a recording region allocation section for allocating a recording region for recording the data; and a file management information generation section for generating file management information for managing the at least one file recorded on the disk, wherein the instruction issuing section includes: a recording region designation instruction issuing section for issuing a recording region designation instruction which, prior to a recording operation to the disk, designates a recording region on the disk as allocated by the recording region allocation section; a split recording instruction issuing section for issuing a split recording instruction for transferring data to be recorded in the recording region designated by the recording region designation instruction issuing section, the data being transferred in a split manner, and for requesting the disk recording drive to record the transferred data; and a recording location requesting instruction issuing section for issuing a recording location requesting instruction for requesting reporting of recording location information of the region recorded by the disk recording drive, wherein the file management information generation section generates file management information based on the recording location information received by the recording location requesting instruction issuing section from the disk recording drive.

In one embodiment of the invention, if the recorded file is an AV file containing at least one of video information and audio information, the file management information generation section registers information for identifying the AV file in file attribute information.

In another embodiment of the invention, the file management information generation section registers a defective region detected during the recording operation as an unused region in unused space management information, the unused space management information being comprised in the file management information.

In another aspect of the present invention, there is provided an information reproduction method for reproducing data from an information recording medium for recording and reproducing data on a sector-by-sector basis, the recorded data being managed as at least one file by using a file structure, the method including: a reproduction region setting step for, prior to reproduction of the at least one file, setting location information of at least one reproduction region to reproduce the data from; a continuous reproduction step for performing a reproduction operation for the reproduction region as set during the reproduction region setting step, and continuing with a reproduction operation for a subsequent region even if an error is detected during reproduction; and a reproduction data transfer step for transferring reproduction data from the reproduction region as set during the reproduction region setting step.

In another aspect of the present invention, there is provided a disk reproduction drive for reproducing data from an information recording medium for recording and reproducing data on a sector-by-sector basis, the recorded data being managed as at least one file by using a file structure, the disk reproduction drive including: an instruction processing section for receiving and processing processing requests, and a reproduction control section for continuously reading the data from the disk and transferring the read data, wherein the instruction processing section includes: a reproduction region setting instruction processing section for, prior to a reproduction operation, processing a reproduction region setting instruction which sets location information of at least one reproduction region; and a read data transfer instruction processing section for processing a read data transfer instruction which requests transfer of read data, and wherein the reproduction control section includes: a read region information storing memory for storing location information of the at least one read region received by the reproduction region setting instruction processing section; a read data storing memory for temporarily storing read data; and a continuous read-ahead processing section for performing a read-ahead process and, even if an error occurs during the read operation, continuing with a read operation for a subsequent region without stopping the read-ahead operation, the read-ahead process including previously reading the data from the disk and storing the read data in the read data storing memory, wherein, upon receiving the read data transfer instruction, the read data transfer instruction processing section transfers the read data stored in the read data storing memory.

In another aspect of the present invention, there is provided an information reproduction system for reproducing data from an information recording medium for recording and reproducing data on a sector-by-sector basis, the recorded data being managed as at least one file by using a file structure, the information reproduction system including an upper control apparatus and the aforementioned disk reproduction drive, wherein the upper control apparatus includes: a file management information interpretation section for interpreting the file management information to obtain location information and attribute information of the at least one file; and an instruction issuing section for issuing an instruction for requesting processes to the disk recording drive, wherein the instruction issuing section includes: a reproduction region setting instruction issuing section for issuing a reproduction region setting instruction based on the recording location information of the at least one file as determined by the file management information interpretation section, and a read data transfer instruction issuing section for issuing a read data transfer instruction for requesting transfer of read data from the region as designated by the reproduction region setting instruction issuing section, and for receiving the read data.

Thus, the invention described herein makes possible the advantages of (1) providing a data structure for a disk medium which permits real-time recording/reproduction of AV data by forestalling seek operations to a physically distant spare area so as to minimize any delay caused by a defective region; and (2) providing a data recording/reproduction method for use with such a data structure.

These and other advantages of the present invention will become apparent to those skilled in the art upon reading and understanding the following detailed description with reference to the accompanying figures.

BRIEF DESCRIPTION OF THE DRAWINGS

FIG. 6 is a data structure diagram illustrating a command control block of a "SKIP WRITE" command according to Example 1 of the present invention.

FIG. 7 is a data structure diagram illustrating a command control block of a "READ SKIPPED ADDRESS" command according to Example 1 of the present invention.

FIG. 8 is a data structure diagram illustrating a skipped address data format according to Example 1 of the present invention.

FIG. 11 is a data structure diagram illustrating a command control block of a "SET READ AV AREA" command according to Example 1 of the present invention.

FIG. 12 is a data structure diagram illustrating a "SET READ AV AREA" data format according to Example 1 of the present invention.

FIG. 13 is a data structure diagram illustrating a "READ AV" command according to Example 1 of the present invention.

FIG. 18 is a data structure diagram illustrating a command control block of a "SET RECORD AREA" command according to Example 2 of the present invention.

FIG. 19 is a data structure diagram illustrating a command control block of a "WRITE AV" command according to Example 2 of the present invention.

FIG. 22 is a flowchart illustrating an AV data recording method according to Example 3 of the present invention.

FIG. 30 is a flowchart illustrating a conventional information reproduction method.

DESCRIPTION OF THE PREFERRED EMBODIMENTS

Example 1

Hereinafter, the present invention will be described by way of example, with reference to the accompanying figures.

Figure 1:
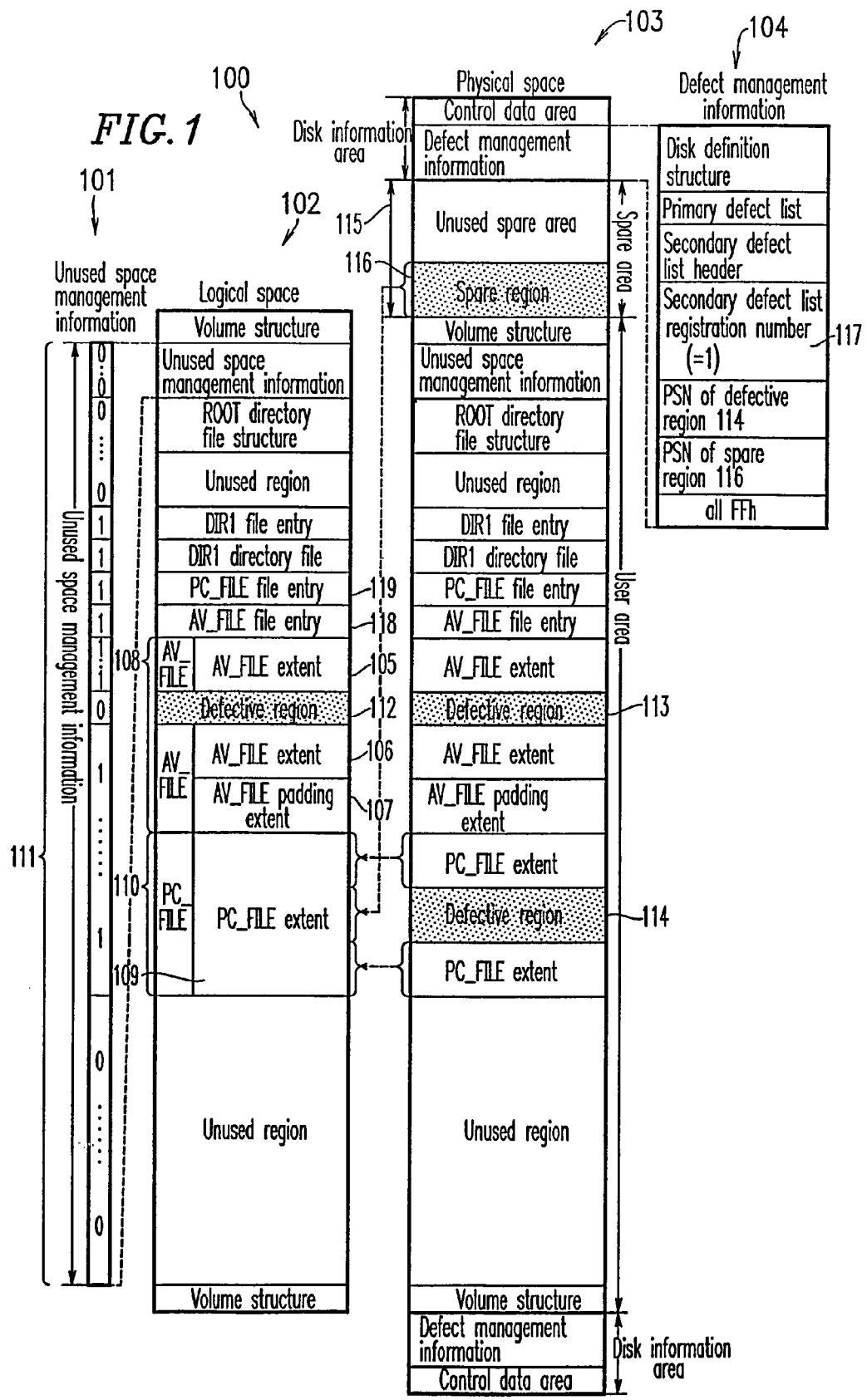
FIG. 1 is a data structure diagram illustrating an information recording disk according to Example 1 of the present invention.

FIG. 1 shows a data structure 100 of a disk medium according to Example 1 of the present invention. In the data structure 100 shown in FIG. 1, a ROOT directory includes a DIR1 directory, where the DIR1 directory includes two files, namely, an "AV_FILE" file 108 for storing AV data and a "PC_FILE" file 110 for storing computer data. The description of the elements which have already been described with reference to FIG. 26 in connection with the conventional technique is omitted. Only the elements which form the features of the invention will be described.

In a logical space 102 shown in FIG. 1, the "AV_FILE" file 108 includes three extents, namely, an AV_FILE extent 105, an AV_FILE extent 106, and an AV_FILE padding extent 107. The PC_FILE 110 includes a PC_FILE extent 109. The example shown in FIG. 1 illustrates a case where a defective region 112 exists between the AV_FILE extent 105 and the AV_FILE extent 106. The defective region 112 is a defective region which was detected at the time of recording the AV_FILE (105 or 106). According to the present invention, in embodiments where a plurality of sectors compose one error correction unit (referred to as an "ECC block"), the defective regions are determined on an ECC block-by-ECC block basis, rather than on a sector-by-sector basis.

Figure 26:
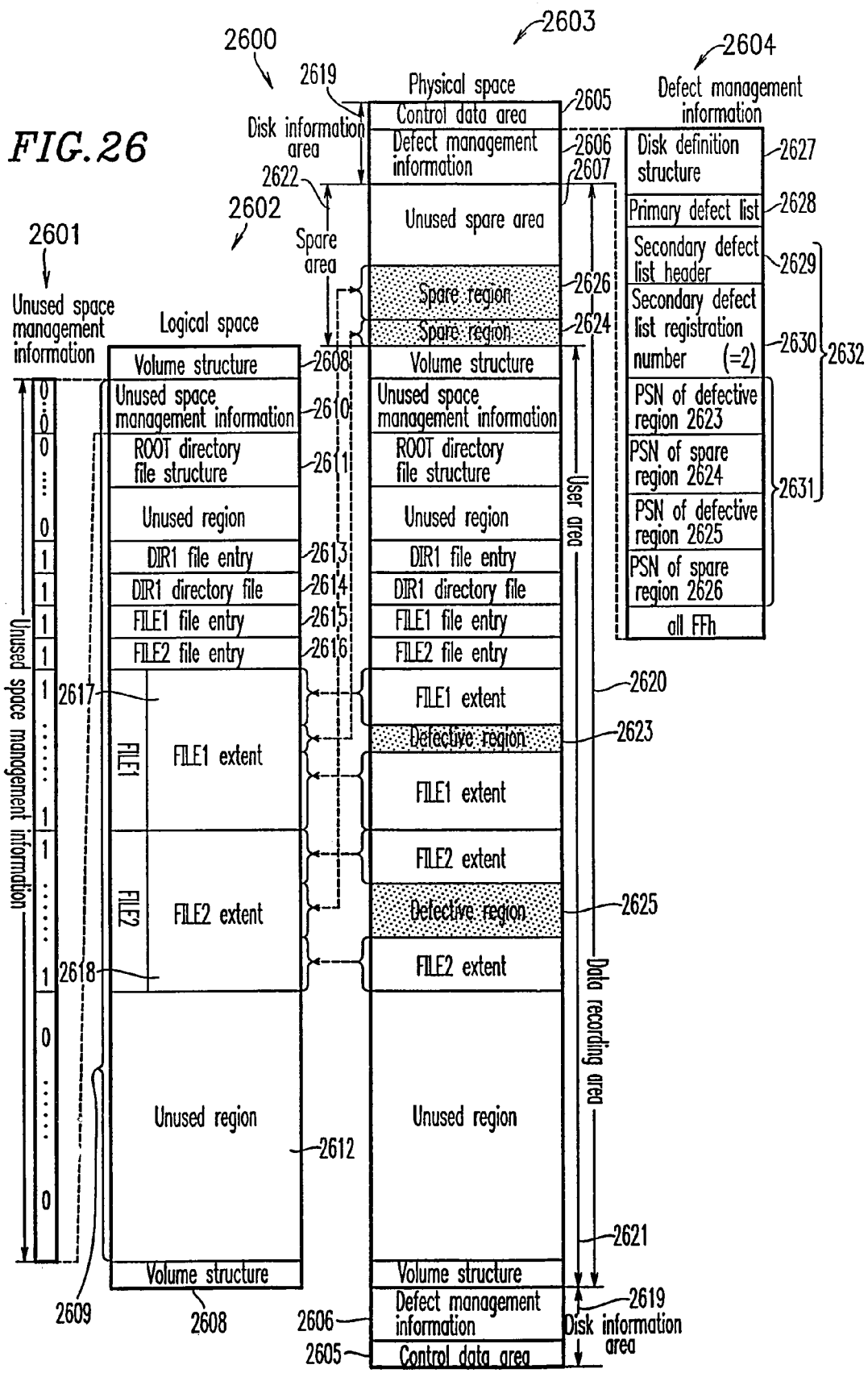
FIG. 26 is a data structure diagram illustrating a conventional information recording disk.
Figure 27:
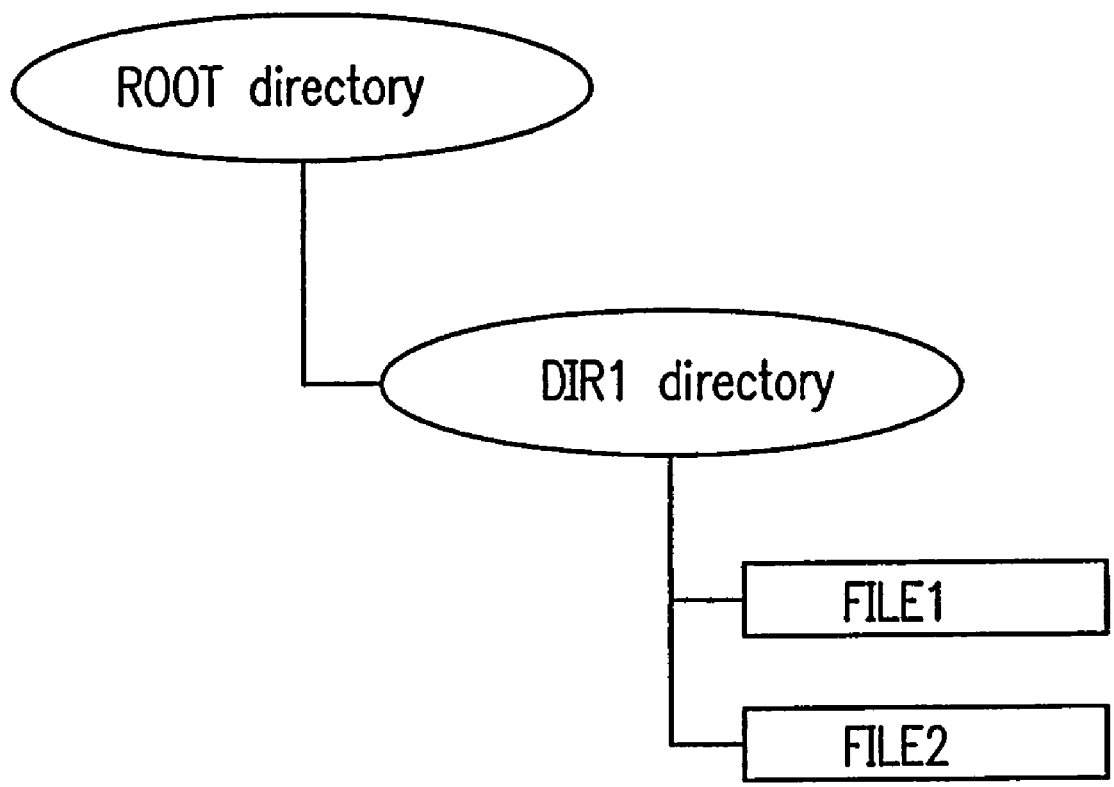
FIG. 27 is a schematic diagram illustrating a general file structure.

In the case of the conventional information recording disk which has been described with reference to FIG. 26, every defective region which is detected at the time of recording is replaced with a spare region within the spare area. However, in accordance with the information recording disk of the present invention, any defective region which is detected at the time of recording AV data is skipped so as to prevent delays which would otherwise be caused by seek operations to a physically distant spare area.

In the logical space 102 illustrated in FIG. 1, the end portion of the AV_FILE 108 is shown as including an extent having a special attribute, called an AV_FILE padding extent. Although no file data is recorded in the AV_FILE padding extent, the AV_FILE padding extent is managed as part of a file. The padding extent is employed for the following reason. In applications where a plurality of sectors compose one error correction unit (or an "ECC block"), e.g., DVD-RAMs (Digital Versatile Disc Random Access Memories), it is desirable to prevent files containing AV data and files containing PC data from being mixed in the same ECC block. Therefore, the padding extent is employed so as to complete an ECC block which includes but is not filled completely by an AV file, so that any PC files will belong in separate ECC blocks. As a result, even in the case where AV files are recorded in real time without performing any time-consuming data verification checks (which would result in some degradation in reliability with respect to the AV files), it is still possible to record PC files which require much higher data reliability than AV files.

Unused space management information 101, which is recorded as file management information is a bit map including bits which correspond to each and every sector in a partition space 111 in a one-to-one manner. As shown in FIG. 1, regions in which file entries and extents are recorded are labeled as "1", meaning "used". On the other hand, unused regions and regions representing the unused space management information itself are labeled as "0", meaning "unused". Note that the defective region 112 in the logical space 102 is labeled as "0", i.e., "unused". As a result, the defective region 112, which cannot be used for recording AV data (because AV data require high real-time recording capabilities), can be used for the recording of PC data, because the replacement process as described in connection with the conventional technique may be performed with respect to PC data.

In the case of an information recording disk where a plurality of sectors compose one ECC block, defective regions are registered on an ECC block-by-ECC block basis. In the case of a DVD-RAM, one ECC block is composed of 16 sectors; therefore, one defective region includes at least 16 sectors which are set to the "unused" status.

The physical space 103 is illustrated as including two defective regions 113 and 114. The defective region 113 is a defect which is detected at the time of recording an AV file (corresponding to the defective region 112 in the logical space 102), and is managed by the file management information in the logical space 102. On the other hand, the defective region 114 is replaced with a spare region 116 within the spare area 115, in a manner similar to the methods used in conjunction with the aforementioned conventional information recording disk. The spare region 116 corresponds to the defective region 114, which is a defect that is detected at the time of recording a PC file. Note that by performing the conventional defect management process for the defective regions (e.g., 114) which are detected at the time of recording a PC file, it becomes possible to attain compatibility with the conventional environment.

Note that, in the example illustrated in FIG. 1, the only region that is subjected to an replacement process is the defective region 114. Accordingly, in defect management information 104, an SDL registration number 117 is set to "1", and the first PSN of the defective region 114 and the first PSN of the spare region 116 are registered.

Figure 2:
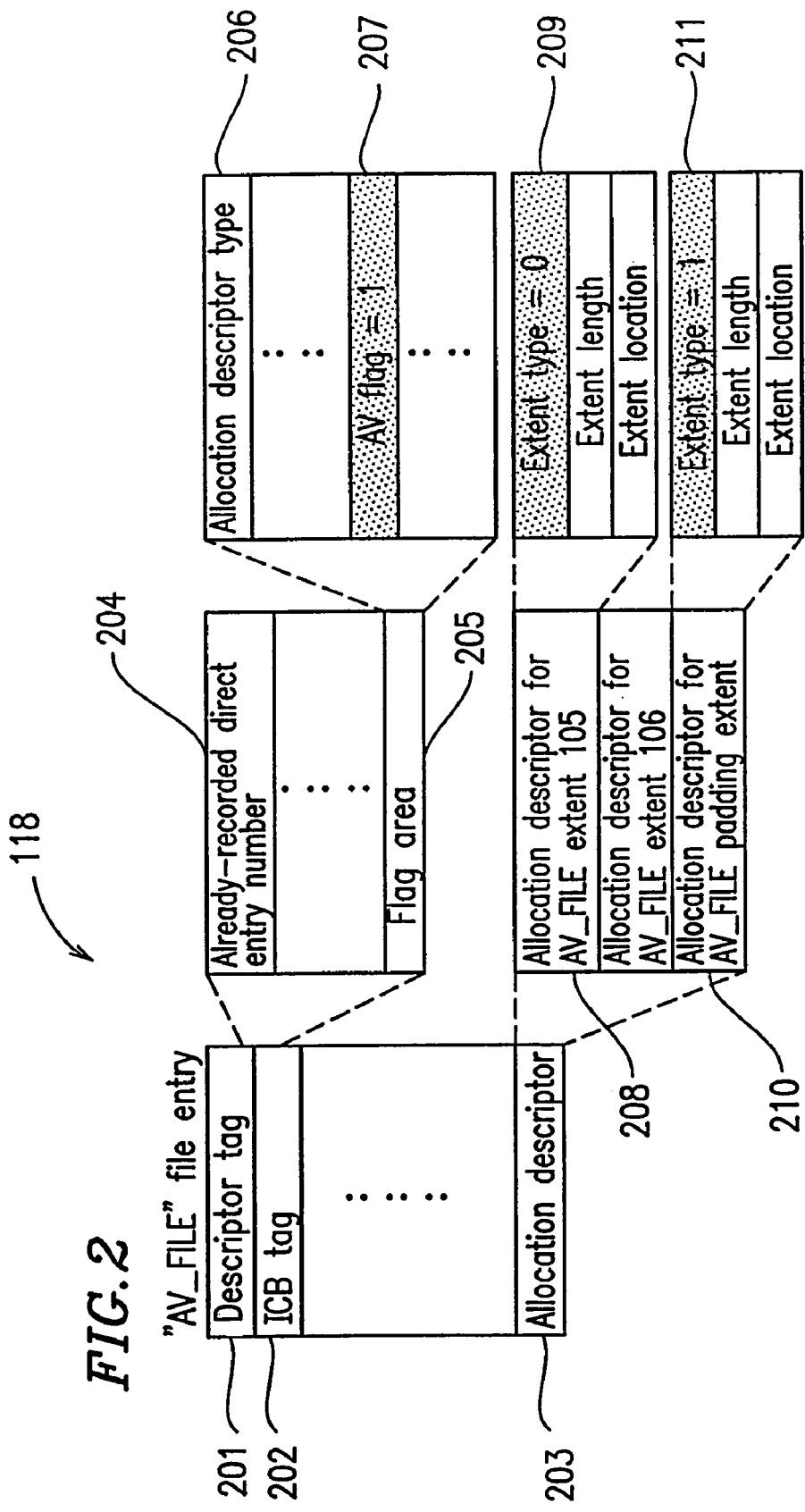
FIG. 2 is a data structure diagram illustrating a file entry for a file containing AV data according to Example 1 of the present invention.

FIG. 2 shows the data structure of an AV_FILE file entry 118. The AV_FILE file entry 118 contains attribute information and recording location information concerning an AV file. A descriptor tag 201, in which a unique value is recorded, is identification information for identifying the beginning of the file entry. The file attribute information is recorded in an ICB tag 202. The location information of an extent composing the AV_FILE is recorded in an allocation descriptor 203.

The ICB tag 202 contains an already-recorded direct entry number 204 for indicating the entry number of already-recorded extents, and a flag area 205 for indicating the file attribute information. Also recorded in the flag area 205 are an allocation descriptor type 206 for identifying the type of the allocation descriptor, and an AV flag 207 for identifying an AV file from a PC file. Since the AV_FILE 108 is a file containing AV data, the AV flag 207 is set to "1". Based on the AV flag 207, it is possible to identify whether a file is an AV file or a PC file.

For each extent, the allocation descriptor 203 includes an extent type for indicating the attribute information of the extent, an extent length for indicating the size information concerning the extent, and an extent location for indicating the location information as to where the extent is recorded. The extent type 209 in the allocation descriptor 208 for the AV_FILE extent 105 is set to "0", meaning a normal extent. As used herein, a "normal extent" is defined as an extent in which file data is recorded. On the other hand, the extent type 211 in the allocation descriptor 210 for the AV_FILE padding extent 107 is set to "1", meaning a padding extent. In other words, the AV_FILE padding extent is managed as part of a file although no file data is recorded in the AV_FILE padding extent, as described above.

Figure 3:
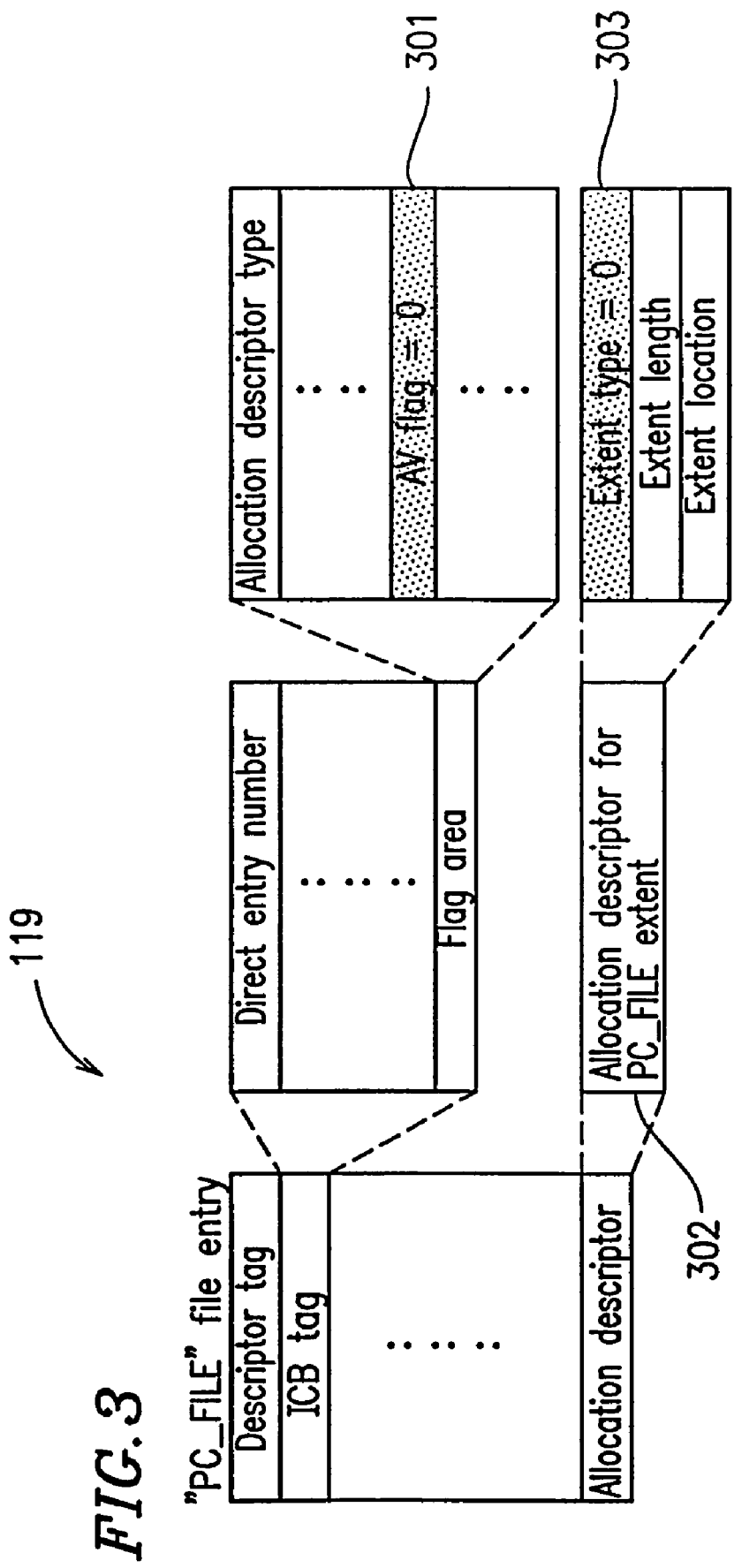
FIG. 3 is a data structure diagram illustrating a file entry for a file not containing AV data according to Example 1 of the present invention.

FIG. 3 shows the data structure of a PC_FILE file entry 119, which is similar to the data structure of the AV_FILE file entry 118 (illustrated in FIG. 2) except that the AV flag 301 is "0", meaning that the PC_FILE is a file which contains no AV data. The PC_FILE 110 does not include a padding extent because the PC_FILE 110 never utilizes a padding extent to fill up an ECC block. Accordingly, an extent type 303 in an allocation descriptor 302 for the PC_FILE extent 110 is set to "0", meaning a normal extent.

Thus, the information recording disk according to Example 1 of the present invention has been described above.

As described above, in accordance with the information recording disk according to the present example of the invention, the conventional replacement process is not performed for any defective region (e.g., 113) that is detected at the time of recording AV data. As a result, it is possible to perform data recording/reproduction without incurring any delay associated with such replacement processes. Instead, the present invention makes possible a high-speed defect management which involves simply skipping the defective region 112, whereas the conventional defect management method would require the aforementioned replacement process for providing an error-free logical space 2602. In addition, by registering a defective region which is detected at the time of recording AV data as an unused region, such a defective region can be used for the recording of PC data in embodiments where the aforementioned replacement process is performed with respect to the PC data (note that AV data require high real-time recording capabilities).

In embodiments where the information recording disk includes ECC blocks, each consisting of a plurality of sectors, the information recording disk according to the present example of the invention attains excellent reliability as an information recording disk by registering defective regions on an ECC block-by-ECC block basis.

In embodiments where the information recording disk includes ECC blocks, each consisting of a plurality of sectors, the information recording disk according to the present example of the invention provides for excellent reliability of PC data even if both AV data and PC data are present on the same disk, by registering a padding extent for ensuring that an ECC block in which AV data is recorded does not include any PC data, and by providing identification information for every extent.

The information recording disk according to the present example of the invention contains identification information for identifying an AV file from a non-AV file as file attributes. As a result, it is possible to selectively employ different reproduction methods in accordance with the specific file attributes. For example, in the case of reproducing an AV file, it is possible to place a higher priority on real-time capabilities than on data reliability.

Next, with reference to the figures, an information recording/reproduction system according to Example 1 of the present invention for recording or reproducing data on the disk medium shown in FIG. 1 will be described, with respect to its structure and operations.

Figure 4:
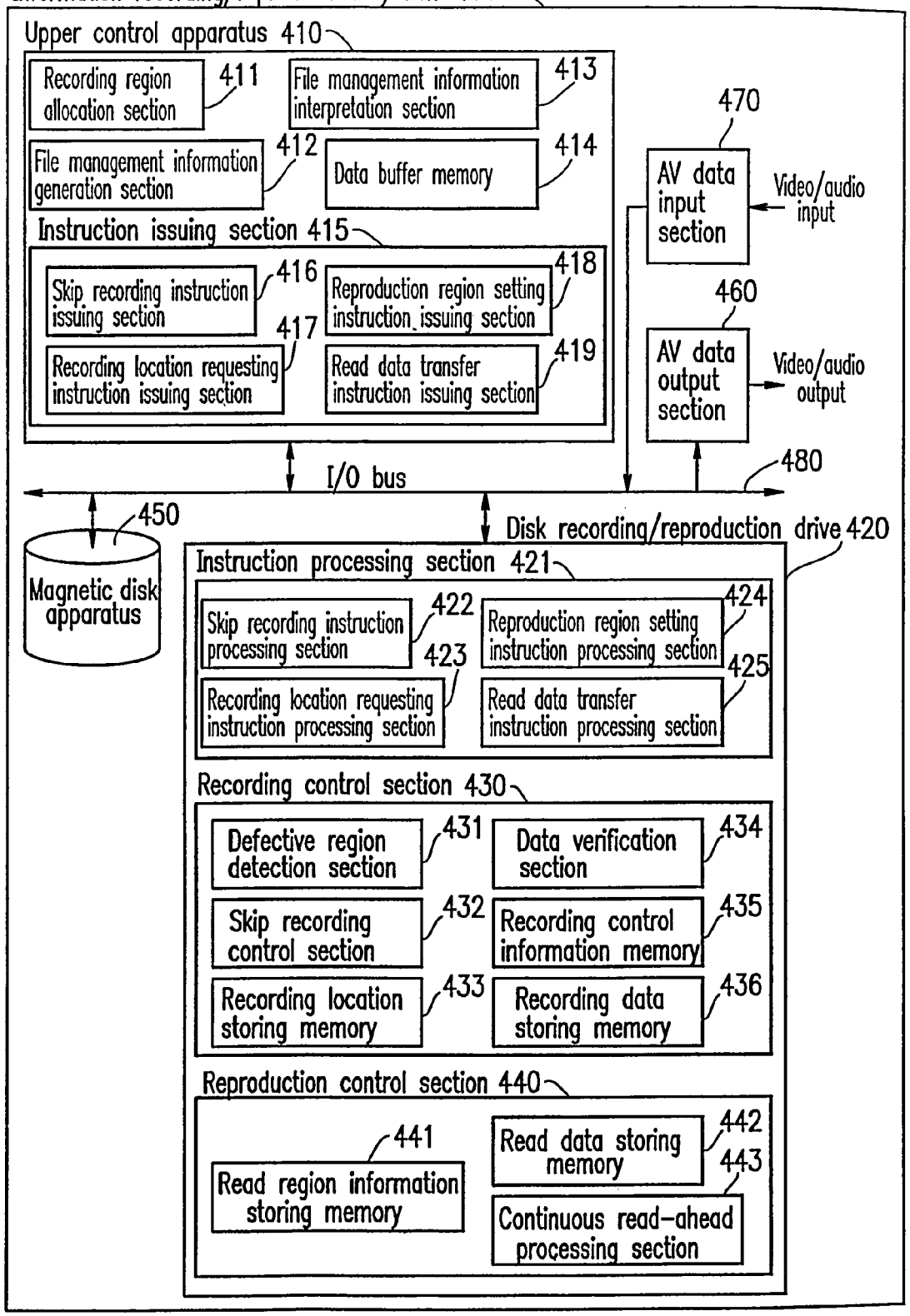
FIG. 4 is a block diagram illustrating an information recording/reproduction system according to Example 1 of the present invention.

FIG. 4 is a block diagram illustrating the structure of the information recording/reproduction system 400. As shown in FIG. 4, the information recording/reproduction system 400 includes an upper control apparatus 410 for controlling the entire system, a disk recording/reproduction drive 420 for controlling the recording/reproduction of an information recording disk or medium, e.g., rewritable disk, (not shown in FIG. 4) in accordance with instructions from the upper control apparatus 410, a magnetic disk apparatus 450, an AV data output section 460 for converting digital AV data into analog video/audio signals and outputting the resultant analog video/audio signals, an AV data input section 470 for converting the input analog AV signal into digital AV data, and an IO/bus 480 for transmitting/receiving data and/or control information.

The upper control apparatus 410 is composed essentially of a microprocessor including a control program and memories for calculation purposes. The upper control apparatus 410 includes: a recording region allocation section 411 for allocating a recording region at the time of recording; a file management information generation section 412 for generating file management information of the recorded files; a file management information interpretation section 413 for calculating the recording location of a file and determining attribute information from the file management information; a data buffer memory 414 for temporarily storing data; and an instruction issuing section 415 for issuing instructions to the disk recording/reproduction drive 420. The instruction issuing section 415 includes a skip recording instruction issuing section 416 for issuing a skip recording instruction which requests a recording while skipping a defective region; a recording location requesting instruction issuing section 417 for issuing a recording location requesting instruction which requests returning of location information for determining a region in which data has been recorded after recording; a reproduction region setting instruction issuing section 418 for issuing a reproduction region setting instruction which designates a region to be reproduced (hereinafter referred to as a "reproduction region") prior to reproduction; and a read data transfer instruction issuing section 419 for issuing a read data transfer instruction which requests the transfer of data which has been read.

The disk recording/reproduction drive 420 is composed essentially of a microprocessor including a control program and memories for calculation purposes, a mechanism which is controlled by the microprocessor, and signal processing circuitry. Functionally, the disk recording/reproduction drive 420 includes: an instruction processing section 421 for processing instructions from the upper control apparatus 410; a recording control section 430 for controlling the recording onto a rewritable disk; and a reproduction control section 440 for controlling the reproduction from the rewritable disk. The instruction processing section 421 includes: a skip recording instruction processing section 422 for processing a skip recording instruction; a recording location requesting instruction processing section 423 for processing a recording location requesting instruction; a reproduction region setting instruction processing section 424 for processing a reproduction region setting instruction; and a read data transfer instruction processing section 425 for processing a read data transfer instruction. The recording control section 430 includes: a defective region detection section 431 for detecting a defective region at the time of recording; a skip recording control section 432 for <performing a recording while skipping a defective region which is detected at the time of recording; a recording location storing memory 433 for storing information concerning a location at which data is recorded; a data verification section 434 for reading recorded data after recording so as to check whether or not the data is properly recorded; a recording control information memory 435 for storing control information which is necessary for recording, e.g., a recording beginning location and a recording length; and a recording data storing memory 436 for temporarily storing data which is received from the upper control apparatus 410. The reproduction control section 440 includes: a read region information storing memory 441 for storing location information of a reproduction region which is designated by the upper control apparatus 410 prior to reproduction; a read data storing memory 442 for temporarily storing data which is read from a rewritable disk; and a continuous read-ahead processing section 443 for performing a read-ahead process (defined later) in accordance with predetermined read region information and continuing the read-ahead process without stopping responsive to the occurrence of an error during a read process.

Figure 9:
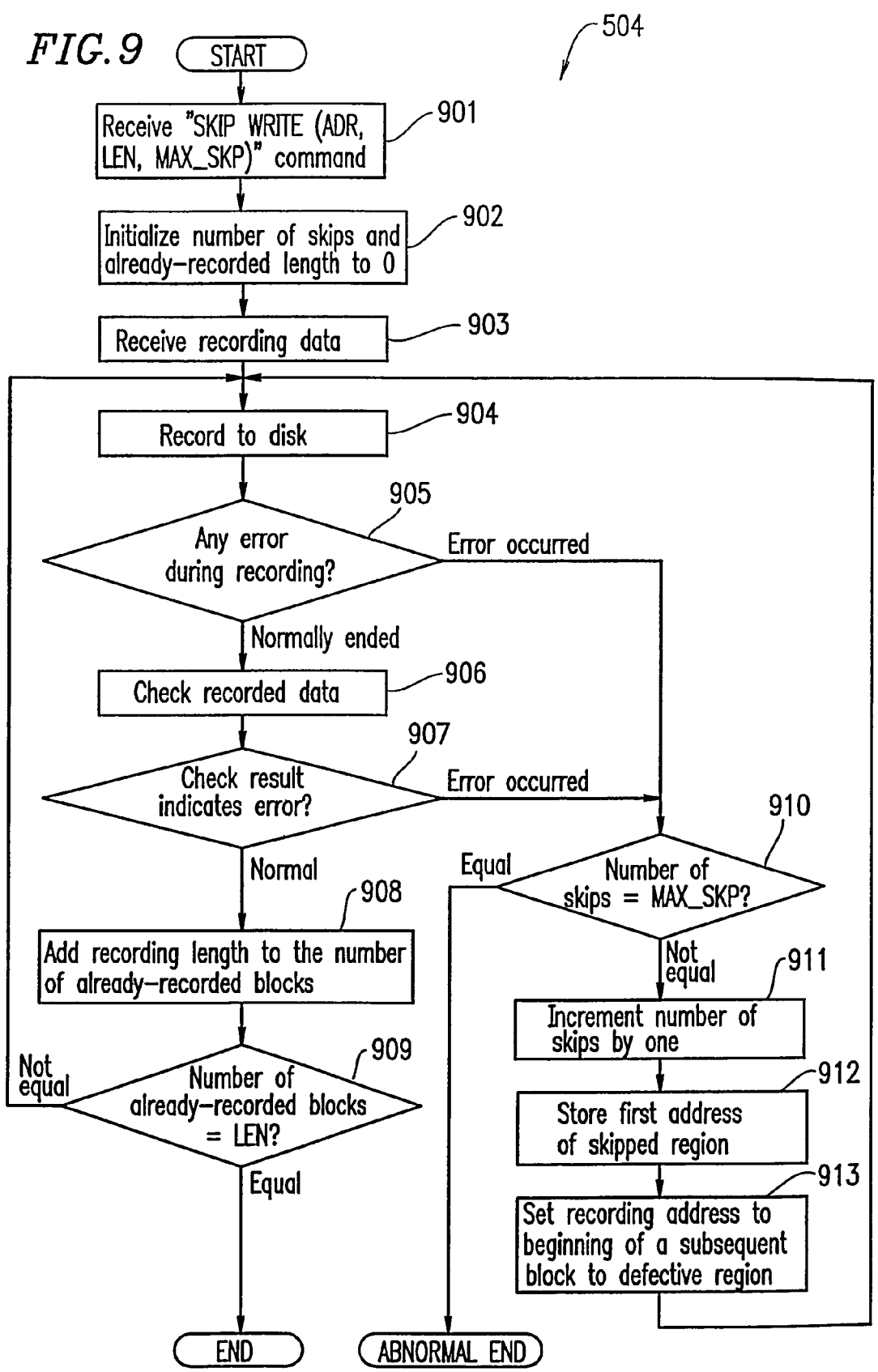
FIG. 9 is a flowchart illustrating a skip recording process according to Example 1 of the present invention.

Next, a recording method for recording a file containing AV data by using the information recording/reproduction system 400 illustrated in FIG. 4 will be described with reference to an overall control process shown in FIG. 5. The description of the overall control procedure will occasionally divert to descriptions of the respective data structures of instructions and communication data transferred between the upper control apparatus 410 and the disk recording/reproduction drive 420 with reference to FIGS. 6, 7, and 8. Also, the recording procedure by the disk recording/reproduction drive 420 will be specifically described with reference to a flowchart shown in FIG. 9. In the overall control process shown in FIG. 5, it is assumed that the file management information for the file recorded on a rewritable disk was previously read at the time of insertion of the disk and interpreted by the file management information interpretation section 413, and that the file management information is retained in the upper control apparatus 410. The overall control process shown in FIG. 5 includes a group of processes 521 to be performed by the upper control apparatus 410, a group of processes 523 to be performed by the disk recording/reproduction drive 420, and flows 522 of instructions, data, process results in an IF protocol between the upper control apparatus 410 and the disk recording/reproduction drive 420.

(Step 501) The upper control apparatus 410 controls the AV data input section 470 to begin receiving AV data. The AV data which is input via the AV data input section 470 is converted into digital data by the AV data input section 470, and thereafter transferred via the I/O bus 480 so as to be stored in the data buffer memory 414.

(Step 502) Prior to recording the AV data, the recording region allocation section 411 in the upper control apparatus 410 obtains vacant region information concerning the rewritable disk from the file management information interpretation section 413, and allocates a recording region. The recording region allocation section 411 allocates a recording region by considering the size of the allocated regions and the physical distance between regions so that the AV data can be smoothly reproduced later.

(Step 503) The skip recording instruction issuing section 416 obtains location information of the region which has been allocated by the recording region allocation section 411, and issues a "SKIP WRITE" command (as a skip recording instruction) to the disk recording/reproduction drive 420. At this time, the skip recording instruction issuing section 416 designates, as parameters of the "SKIP WRITE" command, the location information of the region which has been allocated by the recording region allocation section 411, the size information of the data to be recorded, and the allowable number of skips which may be made at the time of detecting defective regions (i.e., the maximum number of skips that can be made while allowing the data to be entirely recorded within the allocated recording region). Subsequent to the "SKIP WRITE" command, a size of data which has been designated by the "SKIP WRITE" command is transferred from the data buffer memory 414 to the disk recording/reproduction drive 420. FIG. 6 shows a command control block, which is the data structure which is transferred as the "SKIP WRITE" command. The "SKIP WRITE" command has a command control block length of 12 bytes. A unique instruction code which identifies a "SKIP WRITE" command is represented by byte 0. The LSN (location information) of a sector at which to begin recording is represented by the four bytes from byte 2 to byte 5. The number of ECC blocks which may be skipped in the case where a defective region is detected during a recording operation (i.e., allowable number of skips) is represented by byte 6. The number of sectors in the data to be transferred (i.e., size information) is represented by the two bytes from byte 7 to byte 8.

(Step 504) Having received the "SKIP WRITE" command from the upper control apparatus 410, the skip recording instruction processing section 422 in the disk recording/reproduction drive 420 requests the skip recording control section 432 to perform a recording process for the transferred data, starting from a start LSN designated on the rewritable disk. Hereinafter, this operation of the disk recording/reproduction drive 420 will be described with reference to the flowchart shown in FIG. 9.

(Step 901) The skip recording instruction processing section 422 receives the "SKIP WRITE" command and the recording data from the upper control apparatus 410. Along with the "SKIP WRITE" command, the skip recording instruction processing section 422 receives the following parameters which are necessary for executing the command: a parameter "ADR" indicating a start LSN, a parameter "LEN" indicating the number of sectors in the data to be recorded, and a parameter "MAX_SKP" indicating the maximum allowable number of skips which can be made at the time of detecting defective regions. The skip recording instruction processing section 422 stores these parameters in the recording control information memory 435. The parameter "MAX_SKP" indicating the maximum allowable number of skips is a variable which is calculated by the recording region allocation section 411 in the upper control apparatus 410. Specifically, the parameter "MAX_SKP" is calculated to be a value such that any down-shift of the recording location on the rewritable disk due to skipping a defective region will not result in the destruction of a subsequent region which is already in use.

(Step 902) Having received the "SKIP WRITE" command, the disk recording/reproduction drive 420 initializes a region within the recording control information memory 435 for storing the number of ECC blocks that were skipped during recording, and a region for storing the size of data which has already been recorded, both to zero.

(Step 903) Thereafter, the skip recording instruction processing section 422 receives the data to be recorded on the rewritable disk and stores the data in the recording data storing memory 436.

(Step 904) After a predetermined amount of data has been stored in the recording data storing memory 436, the skip recording control section 432 begins a recording operation to the rewritable disk.

(Step 905) During the recording operation, the defective region detection section 431 determines whether or not the region which is under recording is a defective region. The defective region detection section 431 determines a defective region if either one of the following criteria is satisfied: (i) if the physical address which is assigned to each sector as location information on the rewritable disk has not been properly read (in which case the entire ECC block containing such a sector will be determined as a defective region); or (ii) if the monitored amplitude of the amount of light which is reflected from the rewritable disk during recording appears disturbed in a given region over a predetermined level (in which case the entire ECC block containing such a sector will be determined as a defective region). In either case of determining a defective region, the process branches out to Step 910.

(Steps 906, 907) If the recording operation has been completed properly, the data verification section 434 determines whether or not the data has been properly recorded by reading out the data in the region for which the recording operation has been performed. If the data verification section 434 determines an error as a result of the verification, the process branches out to Step 910.

(Step 908) If the data verification section 434 determines no error, the number of sectors which have been recorded is added to the number of already-recorded blocks.

(Step 909) Thereafter, the skip recording control section 432 determines whether or not the number of already-recorded blocks is equal to the variable "LEN" which is stored in the recording control information memory 435. If the number of already-recorded blocks is equal to the variable "LEN", it is determined that all of the designated data has been recorded, and the process is terminated. On the other hand, if the number of already-recorded blocks is smaller than the variable "LEN", the process goes back to Step 904 so as to perform recording of the remainder of the data.

(Step 910) If an error is determined at Step 905 or 907, the number of skips having been made during recording is compared against the variable "MAX_SKP" which is stored in the recording control information memory 435. If the number of skips which has been made during recording is equal to the variable "MAX_SKP", it is determined that the maximum allowable number of skips (which is designated by the "SKIP WRITE" command) has been exceeded, and the process is abnormally-ended.

(Step 911) If the number of skips which has been made during recording is smaller than the variable "MAX_SKP", the number of skips is incremented by one in order to skip the detected defective region. (Step 912) Furthermore, the first LSN of the skipped defective region is stored in the recording location storing memory 433. (Step 913) Then, the skip recording control section 432 sets the location information for the next recording operation to a subsequent region. Although omitted from illustration in the flowchart of FIG. 9, the location information in the recording data storing memory 436 is also updated so that, after skipping the defective region, the data which was going to be recorded in the defective region can be recorded in a subsequent region (i.e., the region subsequent to the defective region). Thereafter, the process goes back to Step 904 to perform recording for the subsequent region.

Thus, the skip recording control section 432 skips any defective regions which are detected at the time of recording, and stores the location information of such defective regions, and continues the process until all of the data are properly recorded.

(Step 505) Referring back to FIG. 5, having performed the skip recording process, the disk recording/reproduction drive 420 returns a "completed" status to the upper control apparatus 410.

(Step 506) The recording location requesting instruction issuing section 417 in the upper control apparatus 410 issues a "READ SKIPPED ADDRESS" command to the disk recording/reproduction drive 420 for inquiring the location information of the defective regions that were skipped during the skip recording process at Step 504. FIG. 7 shows a command control block of the "READ SKIPPED ADDRESS" command. Hereinafter, the data structure of the command control block of the "READ SKIPPED ADDRESS" command will be described with reference to FIG. 7.

The command control block of the "READ SKIPPED ADDRESS" command is 12 bytes long. A unique instruction code which identifies a "READ SKIPPED ADDRESS" command is designated in byte 0. An allocation length is designated in the two bytes from byte 7 to byte 8. As used herein, the allocation length indicates the memory size which is provided by the upper control apparatus 410 for storing the returned skipped address data. If the returned data is larger than the designated allocation length, the disk recording/reproduction drive 420 performs a rounding process, so that no data which is larger in size than the allocation length will be returned.

(Step 507) Referring back to FIG. 5, having received the "READ SKIPPED ADDRESS" command, the recording location requesting instruction processing section 423 in the disk recording/reproduction drive 420 returns the location information of the defective regions which were stored in the recording location storing memory 433 during the skip recording process at Step 504 as skipped address data.

FIG. 8 shows the format of the skipped address data, and the meaning of the respective fields of the skipped address data will be described with reference to FIG. 8. The skipped address data includes a skipped address number 801 and a list 802 of skipped addresses. The two bytes from byte 0 to byte 1 represent the skipped address number 801, in which the number of skipped addresses to be returned is set. Byte 2 and the subsequent bytes represent a list 802 of first LSNs of the skipped ECC blocks. If the skipped address number 801 is 0, the list 802 of skipped addresses is not returned. The skipped address is returned on an ECC block-by-ECC block basis. Therefore, in the case of a rewritable disk in which a plurality of sectors compose one ECC block, if the number of skipped addresses is 1, it is indicated that there are as many defective sectors as the number of sectors composing one ECC block.

(Step 508) Referring back to FIGS. 1, 2, and 5, having received the skipped address data, the file management information generation section 412 in the upper control apparatus 410 generates file management information. The file management information generation section 412 determines that the transferred size of data has been recorded in regions other than the regions which were skipped in accordance with the skipped address data, and generates a file entry 118 (FIGS. 1 and 2) of AV files. At this time, the file management information generation section 412 sets the bits in the unused space management information 101 that correspond to the extents 105 and 106 which are designated by the allocation descriptor 203 (FIG. 2) in the file entry 118 to "1", i.e., "used". Furthermore, the skipped regions are determined based on the skipped address data which was returned at Step 507. As a result, all sectors in the skipped regions are determined as defective regions, and their corresponding bits in the unused space management information 101 are set to "01", i.e., "unused". If the end of a file extent (e.g., 106) falls in the middle of an ECC block, the file management information generation section 412 registers the remainder of that ECC block as a padding extent (e.g., 107). At this time, the extent type 211 (FIG. 2) of the padding extent (e.g., 107) is set to "1" to identify a padding extent. Thereafter, the file management information generation section 412 stores the generated file management information in the data buffer memory 414 before the file management information is recorded on the rewritable disk.

(Step 509) The upper control apparatus 410 issues a "WRITE" command, which requests the disk recording/reproduction drive 420 to record the generated file management information stored in the data buffer memory 414 by a conventional recording method. An LSN at which to start recording, and the number of sectors to be recorded, are designated as parameters in the "WRITE" command.

Figure 28:
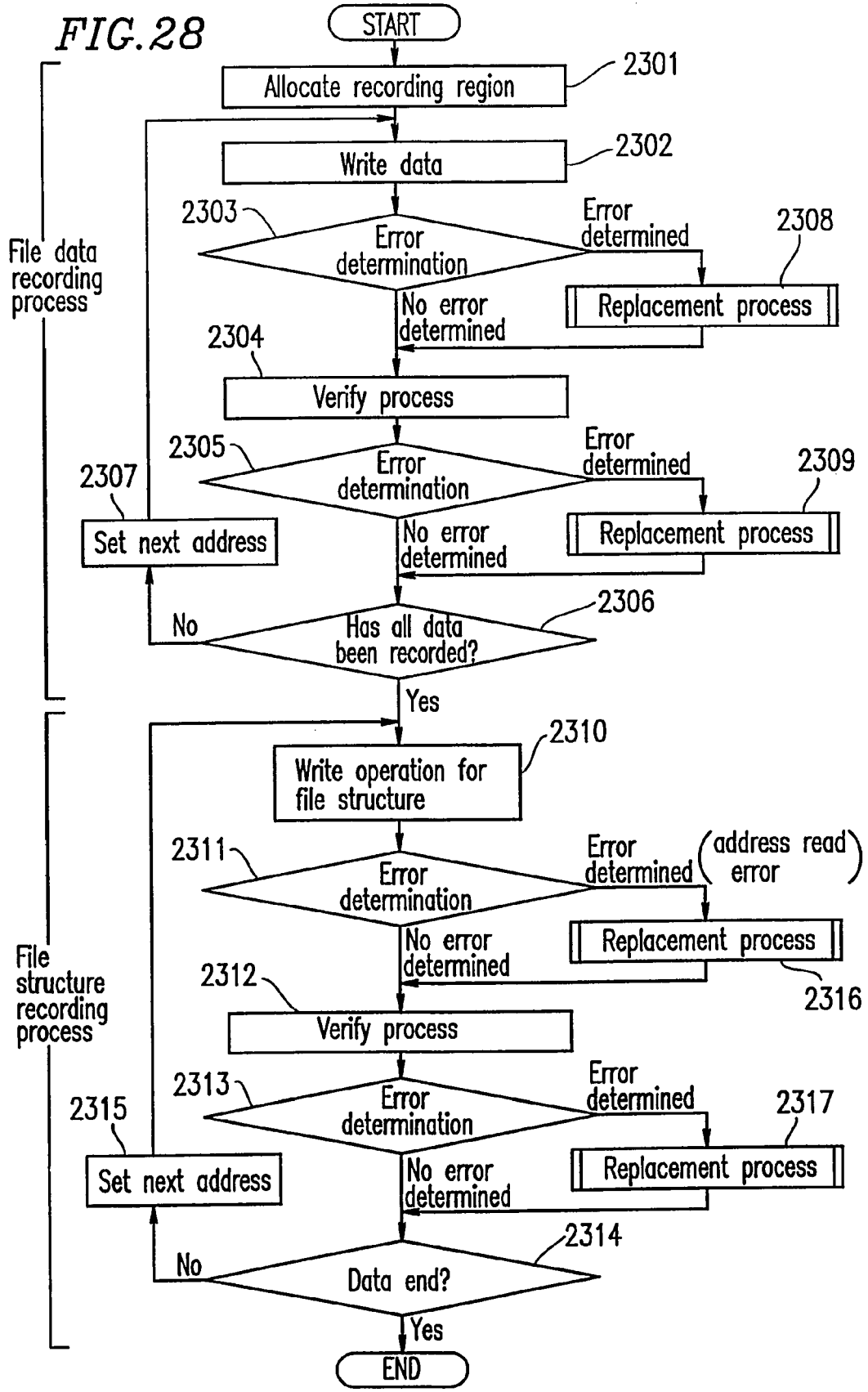
FIG. 28 is a flowchart illustrating a conventional information recording method.
Figure 29:
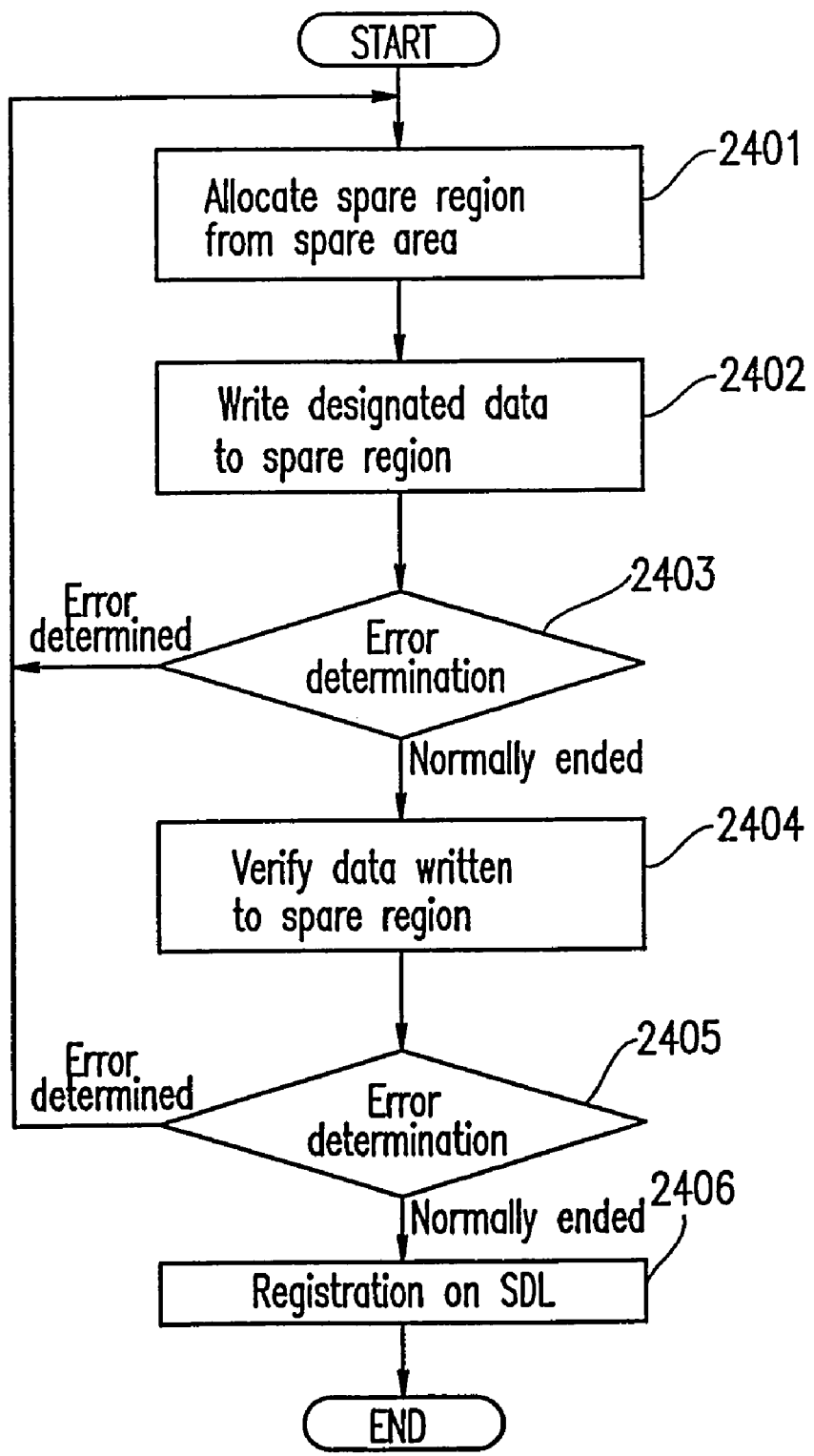
FIG. 29 is a flowchart illustrating an replacement process according to a conventional information recording method.

(Step 510) Having received the "WRITE" command, the disk recording/reproduction drive 420 performs a recording process similar to the conventional method for recording a file structure described with reference to FIG. 28. Any defective regions which are detected during the recording operation in accordance with the "WRITE" command are subjected to a replacement process according to the conventional replacement method.

(Step 511) When the recording of all of the data which were designated by the "WRITE" command is completed in accordance with the conventional recording method, the disk recording/reproduction drive 420 returns a "completed" status to the upper control apparatus 410. Thus, a rewritable disk having the data structure shown in FIG. 1 can be accomplished.

Thus, the information recording method according to Example 1 of the present invention has been described above.

Figure 10:
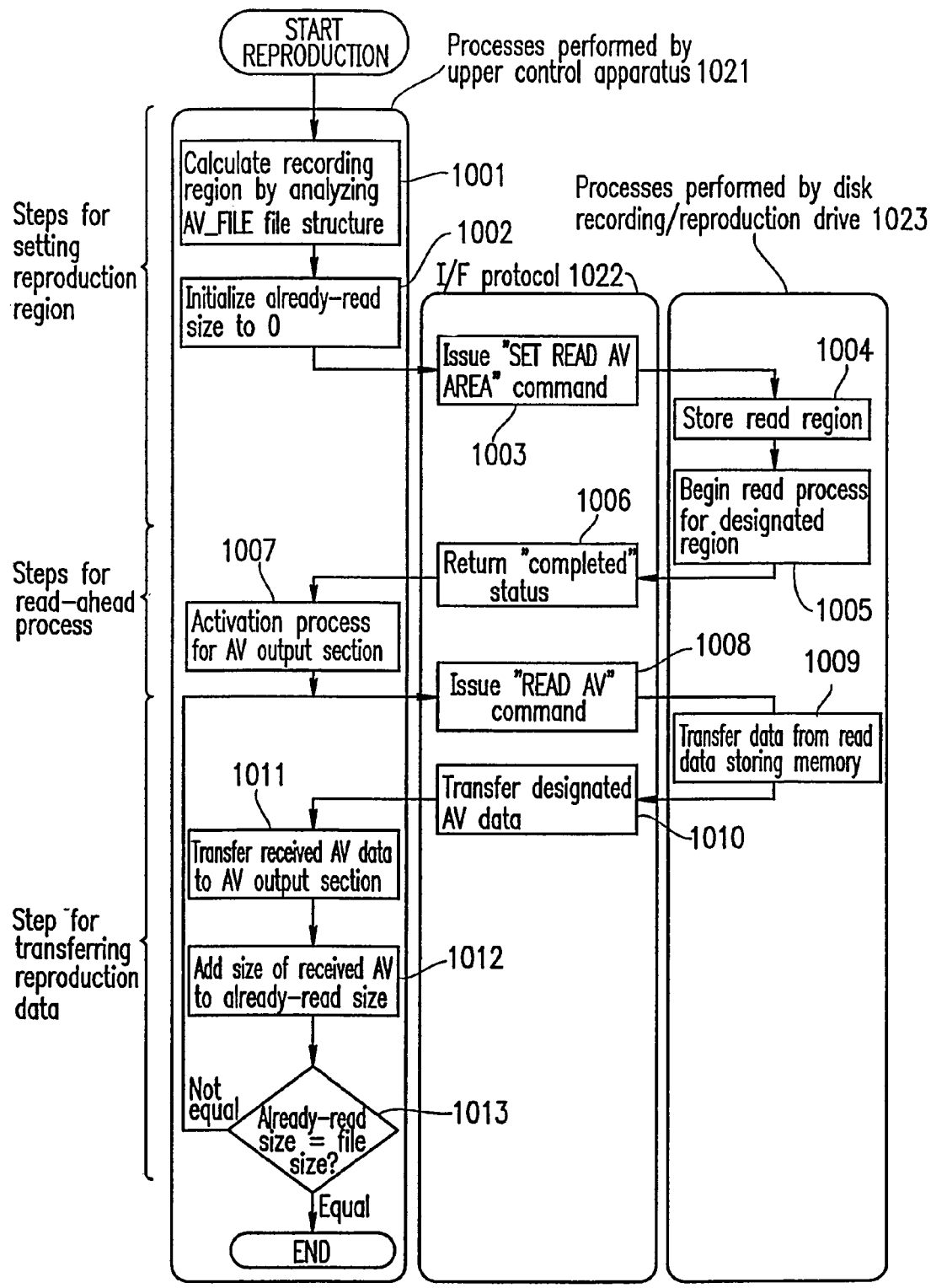
FIG. 10 is a block diagram illustrating a method for reproducing a file containing AV data according to Example 1 of the present invention.

Next, the reproduction method for AV files according to Example 1 of the present invention will be described, with reference to the overall control process shown in FIG. 10.

The description of the overall control procedure will occasionally divert to descriptions of the data structures of commands and data transferred between the upper control apparatus 410 and the disk recording/reproduction drive 420 with reference to FIGS. 11, 12, and 13. The overall control process shown in FIG. 10 includes a group of processes 1021 to be performed by the upper control apparatus 410, a group of processes 1023 to be performed by the disk recording/reproduction drive 420, and flows 1022 of commands and data transferred between the upper control apparatus 410 and the disk recording/reproduction drive 420.

(Step 1001) The file management information interpretation section 413 in the upper control apparatus 410 interprets a file structure on a rewritable disk so as to determine whether or not the file to be reproduced is an AV file. If it is determined that the file to be reproduced is an AV file, the file management information interpretation section 413 calculates the recording location of the file data of the AV file to be reproduced and the size-to-be-read, and inform these parameters to the reproduction region setting instruction issuing section 418.

(Step 1002) The read data transfer instruction issuing section 419 in the upper control apparatus 410 initializes a counter for counting the already-read size to zero.

(Step 1003) The reproduction region setting instruction issuing section 418 in the upper control apparatus 410 issues a "SET READ AV AREA" command, which sets the recording location of the file data and the size-to-be-read (which have been calculated by the file management information interpretation section 413) in the disk recording/reproduction drive 420. Specifically, the "SET READ AV AREA" command is an instruction which, prior to the reproduction of an AV file, sets one or more continuous regions in which file data are recorded. FIG. 11 shows the data structure of a command control block of the "SET READ AV AREA" command. The "SET READ AV AREA" command control block consists of 12 bytes of data. A unique instruction code which identifies a "SET READ AV AREA" command is set in byte 0. In the two bytes from byte 7 to byte 8, a region data length (in bytes) to be transferred is designated. After transferring this command control block, the reproduction region setting instruction issuing section 418 transfers region data of the size designated by the transfer data length to the disk recording/reproduction drive 420. FIG. 12 shows a SET READ AV AREA data format, i.e., the region data to be transferred. The region data is composed of a list 1203 which includes the AV area number 1201 (which represents the number of continuous regions to be set) and pairs 1202 of start addresses (LSN) and end addresses (LSN). When the AV area number is "0", the start LSN and the end LSN of any regions are not transferred. Byte 2 and the subsequent bytes are set in the order of the start LSNs and the end LSNs of the respective AV areas to be set for reproduction.

(Step 1004) Having received the "SET READ AV AREA" command, the reproduction region setting instruction processing section 424 in the disk recording/reproduction drive 420 stores the reproduction region data, which is received from the upper control apparatus 410, in the read region information storing memory 441.

(Step 1005) Once informed that the reproduction region data has been received from the reproduction region setting instruction processing section 424, the continuous read-ahead processing section 443 in the disk recording/reproduction drive 420 begins a read-ahead process while referring to the location information of the reproduction region which is stored in the read region information storing memory 441. As used herein, a "read-ahead process" is defined as a process of previously reading data from the rewritable disk in anticipation of a subsequent data transfer request, and storing the data in the read data storing memory 442. Usually, a data read operation is performed in such a manner that a region in which a read error occurred is first subjected to retry processes for recovering from the error; and if the error cannot be solved by such an error recovery process, the read process is terminated, thereby marking an abnormal end. However, in a read-ahead process associated with the "SET READ AV AREA" command, the continuous read-ahead processing section 443 does not perform retry processes even if an error occurs; instead, the continuous read-ahead processing section 443 continues with the read-ahead process for a subsequent region. This is in order to prevent a substantial decrease in the data reading speed caused by retry processes, which might result in critical problems such as disturbances in the reproduced images during AV data reproduction.

The disk recording/reproduction drive 420 does not report an "error" status to the upper control apparatus 410. Therefore, in order to prevent malfunctioning due to the AV data output section 460 receiving error-ridden data, the continuous read-ahead processing section 443 reports an error by setting an error flag contained at a predetermined position in the returned data to "1". The data structure which is transferred to the upper control apparatus 410 will be described in the description of Step 1010.

(Step 1006) After completing storing the received data and informing to the continuous read-ahead processing section 443, the reproduction region setting instruction processing section 424 in the disk recording/reproduction drive 420 returns a "completed" status to the upper control apparatus 410 to indicate that the "SET READ AV AREA" command has properly ended.

(Step 1007) The upper control apparatus 410 performs an activation process for the AV data output section 460. Once activated, the AV data output section 460 enters a reproduction data input wait state. Upon detecting transfer of reproduction data in this state, the AV data output section 460 converts the transferred data into analog video/audio signals, and outputs the analog video/audio signals.

(Step 1008) The read data transfer instruction issuing section 419 in the upper control apparatus 410 issues a "READ AV" command, which requests transfer of the data which has been read from the rewritable disk, to the disk recording/reproduction drive 420. FIG. 13 shows the data structure of a command control block of the "READ AV" command. The command control block of the "READ AV" command consists of 12 bytes of data. A unique instruction code which identifies a "READ AV" command is set in byte 0. In the four bytes from byte 2 to byte 5, the first LSN of a region for which transfer of read data is required is designated. The two bytes from byte 7 to byte 8 indicate the transfer length, in which the data length (in bytes) for which transfer is required is designated.

(Step 1009) Having received the "READ AV" command, the read data transfer instruction processing section 425 in the disk recording/reproduction drive 420 confirms whether or not the AV data in the region which is designated by the parameters of the "READ AV" command is already stored in the read data storing memory 442. If it is determined that the AV data which is read from the designated region is already stored in the read data storing memory 442, the read data transfer instruction processing section 425 immediately transfers the AV data to the upper control apparatus 410. On the other hand, if it is determined that the AV data which is read from the designated region is not stored yet, the read data transfer instruction processing section 425 performs data transfer only after the AV data is stored by the continuous read-ahead processing section 443.

Figure 14:
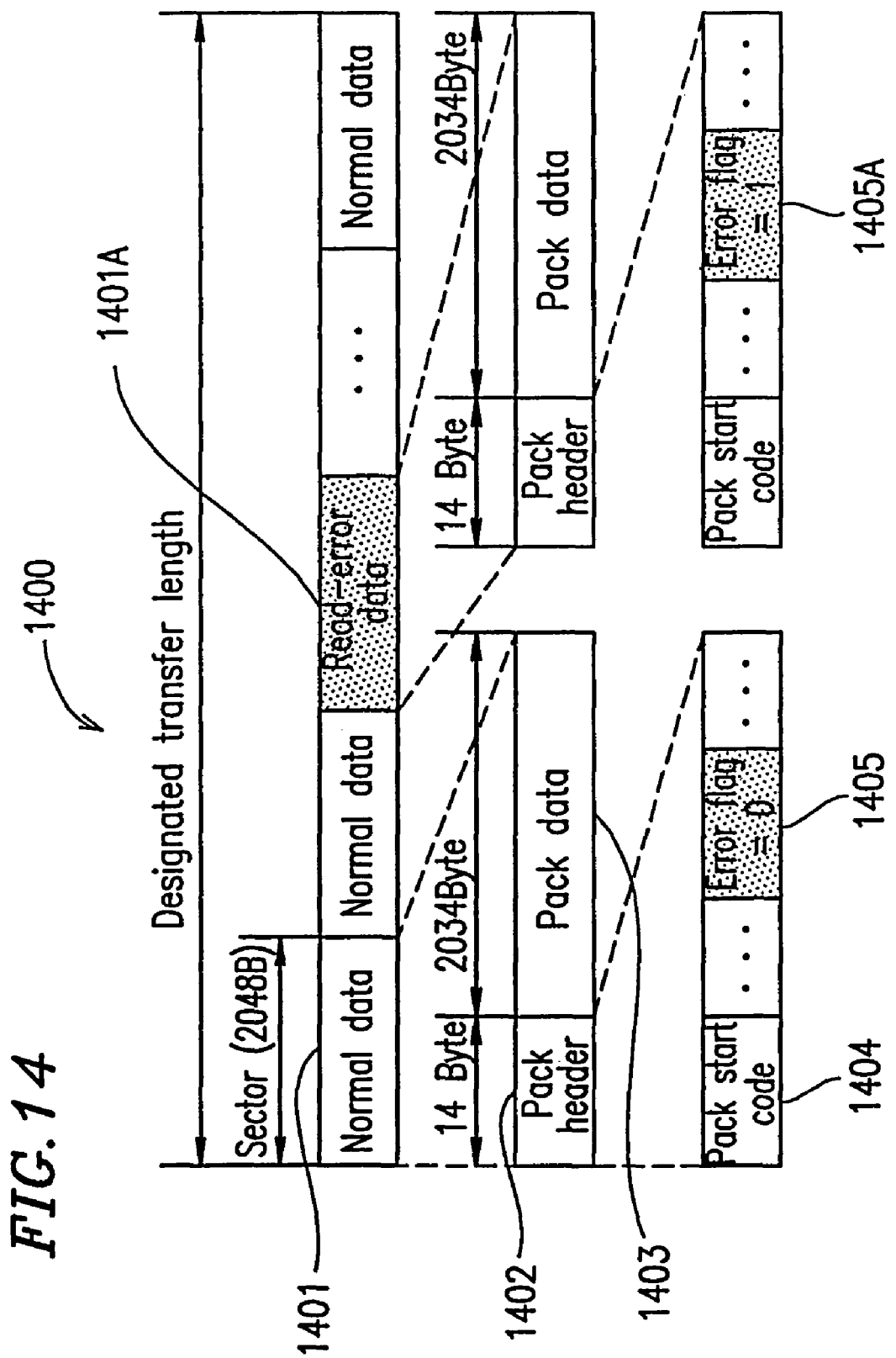
FIG. 14 is a data structure diagram illustrating returned data associated with an AV data read error.

(Step 1010) After the AV data which has been transferred by the read data transfer Instruction processing section 425 in the disk recording/reproduction drive 420 is received by the read data transfer instruction issuing section 419, the AV data is stored in the data buffer memory 414. However, the returned AV data may contain an error, as mentioned with respect to Step 1005. FIG. 14 shows a data structure 1400 of the read data which is transferred from the disk recording/reproduction drive 420 to the upper control apparatus 410. The read data has 2048 bytes per sector. A number of sectors of data, as designated by the transfer length parameter of the "READ AV" command, is transferred. In the case of AV data, the 2048 bytes of data composing each sector corresponds to a unit referred to as a "pack" 1401. The pack 1401 is further subdivided into a pack header 1402 (consisting of 14 bytes) and pack data 1403 (consisting of 2034 bytes). The pack header 1402 includes a pack start code 1404 in which a unique code for identifying the beginning of a pack is stored, and an error flag 1405 which indicates whether or not the pack data includes an error. As shown in FIG. 14, if the read data to be returned is the properly-read data 1401, the error flag 1405 is set to "0", meaning normal data. On the other hand, the error flag 1405A for data 1401A in which a read error has occurred is set to "1", meaning that the data may include an error. Based on these error flags, the AV data output section 460 is capable of recovery processing by complementing the data from the preceding and/or subsequent data, without reproducing any error-ridden data.

(Step 1011) The upper control apparatus 410 transfers the read data which is stored in the data buffer memory 414 to the AV data output section 460. Since the AV data output section 460 has been activated since Step 1007, any input reproduction data will be readily converted into analog video/audio signals for output.

(Step 1012) The read data transfer instruction issuing section 419 in the upper control apparatus 410 adds the size of the AV data which has been received from the disk recording/reproduction drive 420 to the already-read size.

(Step 1013) The read data transfer instruction issuing section 419 in the upper control apparatus 410 compares the already-read size against the file size which is under reproduction. If the already-read size coincides with the file size which is under reproduction, it is determined that the entire AV file has been read, and the process is terminated. If the already-read size does not coincide with the file size which is under reproduction, the process goes back to Step 1008 in order to reproduce the remainder of the AV data, and continues the reproduction operation.

Thus, the reproduction method according to Example 1 of the present invention has been described above.

As described above, in accordance with the information recording method according to the present invention, any defective regions which are detected at the time of recording are skipped during recording. As a result, the delay in the recording/reproduction process associated with the conventional replacement process is substantially eliminated, thereby enabling real-time recording/reproduction of AV data.

In accordance with the information recording method according to the present example of the invention, defective regions are managed as unused regions by the file management information. This makes it possible to record PC data by using a conventional replacement method for the LSNs which are determined as defective regions.

In accordance with the information recording method according to the present example of the invention, by performing a data verification process, it becomes possible to attain high reliability in applications where real-time capabilities are required not during recording but during reproduction, e.g., recording AV data which is already stored in a magnetic disk apparatus 450.

Since an allowable number of skips is set during a skip recording process, even if a large number of defective regions are skipped, it is still possible to prevent the destruction of the subsequent regions in which other file data may be recorded.

If the end of an AV file extent happens to fall in the middle of an ECC block, the remainder of that ECC block is registered as a padding extent, thereby preventing other files from being recorded in the same ECC block. Accordingly, in embodiments where AV data are recorded without any data verification in order to facilitate real-time recording, it is still possible to prevent files containing AV data and files containing PC data from being mixed in the same ECC block. As a result, the reliability of PC data is ensured.

In accordance with the information recording method according to the present example of the invention, identification information for identifying AV data from other types of data is registered in the file management information, so that it is possible, at the time of reproduction, to know whether or not the data requires real-time processing capabilities. As a result, it is possible to perform the high-speed reproduction method illustrated in the present example for the AV data, which may advantageously differ from the reproduction method used for PC data reproduction.

In accordance with the information recording method according to the present example of the invention, one or more reproduction regions are set prior to reproduction in order to realize a read-ahead process for previously reading a plurality of regions, thereby making for even faster reproduction. As a result, AV data reproduction can be performed so that video/audio information is smoothly reproduced without disruptions.

Although the recording data is illustrated as being checked by the data verification section 434 in the information recording method according to the present example of the invention, it will be appreciated that such data verification may be omitted during recording in applications where higher real-time capabilities are required, e.g., where AV data is input at a very high transfer rate.

In accordance with the information recording method according to the present example of the invention, the defective regions which are detected during skip recording are registered as skipped and unused regions in the file management information. Alternatively, the disk recording/reproduction drive 420 may register such defective regions on the SDL without allocating any spare regions therefor, and subsequently perform the allocation of an replacement location and the replacement process at the time of the next PC data recording.

In accordance with the information recording method according to the present example of the invention, the defective regions which are detected at the time of recording are skipped. However, it will be appreciated that all of the defective regions which have already been detected and registered on the SDL may also be skipped.

In accordance with the information recording method according to the present example of the invention, a region is designated based on its start LSN and end LSN by the reproduction region setting instruction. However, the designation may alternatively be based on a start LSN and a region length, for example, so long as a region can be identified.

In accordance with the information recording method according to the present example of the invention, the continuous read-ahead processing section 443 may perform seek operations and the like as appropriate for ensuring real-time capabilities during AV data reproduction.

In accordance with the information reproduction method according to the present example of the invention, the reproduction region setting instruction issuing section 418 sets all the reproduction regions within a file, prior to a reproduction process. However, in embodiments where the read region information storing memory 441 of the system has only a small capacity, for example, it is also applicable to perform reproduction in a number of subdivided stages, e.g., designating regions up to the middle of a file and performing a reproduction process directed to those regions, and thereafter designating subsequent regions and performing a reproduction process directed to those regions.

In accordance with the information recording/reproduction system 400 according to the present example, the transfer of information between the upper control apparatus 410 and the disk recording/reproduction drive 420 is achieved based on the recording location requesting instruction, the reproduction region setting instruction, and the like. However, in embodiments where the upper control apparatus 410 and the disk recording/reproduction drive 420 of the system share a common memory region, etc., which is accessible to both the upper control apparatus 410 and the disk recording/reproduction drive 420, similar processes can be realized by performing writing/reading for such a memory region, thereby obviating the aforementioned instructions.

Example 2

Next, with reference to the figures, an information recording/reproduction system 1500 according to Example 2 of the present invention for recording or reproducing data on the disk medium shown in FIG. 1 will be described, with respect to its structure and operations.

Figure 15:
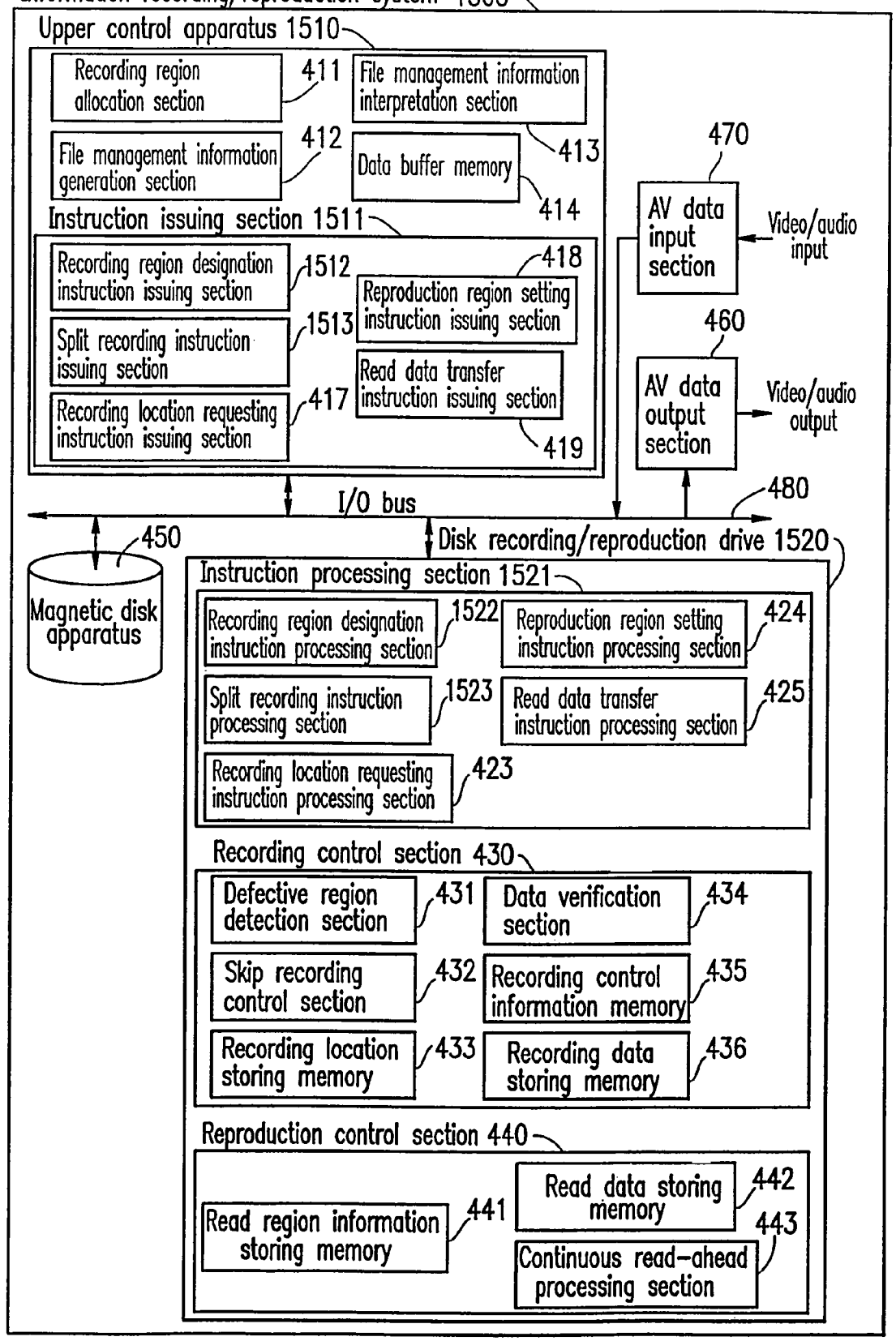
FIG. 15 is a block diagram illustrating an information recording/reproduction system according to Example 2 of the present invention.

FIG. 15 is a block diagram illustrating the structure of the information recording/reproduction system 1500 according to Example 2 of the present invention. Hereinafter, the respective elements of the information recording/reproduction system 1500 will be described. The descriptions of those elements which have their counterparts in the information recording/reproduction system 400 shown in FIG. 4 will be omitted.

As shown in FIG. 15, the information recording/reproduction system 1500 includes an upper control apparatus 1510, a disk recording/reproduction drive 1520, a magnetic disk apparatus 450, an AV data output section 460, an AV data input section 470, and an IO/bus 480.

The upper control apparatus 1510 is composed essentially of a microprocessor including a control program and memories for calculation purposes. The upper control apparatus 1510 includes a recording region allocation section 411, a file management information generation section 412, a file management information interpretation section 413, a data buffer memory 414, and an instruction issuing section 1511 for issuing instructions to the disk recording/reproduction drive 1520. The instruction issuing section 1511 includes: a recording region designation instruction issuing section 1512 for issuing a recording region designation instruction which designates a recording region prior to a recording operation; a split recording instruction issuing section 1513 for issuing a split recording instruction for making a recording request for a recording region and performing a data transfer in a split manner; a recording location requesting instruction issuing section 417 for issuing a recording location requesting instruction which requests returning of the location information a location in which a file has been recorded after recording; a reproduction region setting instruction issuing section 418 for issuing a reproduction region setting instruction which designates a region to be reproduced prior to a reproduction operation; and a read data transfer instruction issuing section 419 for issuing a read data transfer instruction which requests the transfer of data which has been read.

The disk recording/reproduction drive 1520 includes: an instruction processing section 1521 for receiving and processing instructions from the upper control apparatus 1510; a recording control section 430 for controlling the recording onto a rewritable disk (not shown); and a reproduction control section 440 for controlling the reproduction from the rewritable disk. The instruction processing section 1521 includes: a recording region designation instruction processing section 1522 for receiving and processing a recording region designation instruction; a split recording instruction processing section 1523 for receiving and processing a split recording instruction; a recording location requesting instruction processing section 423; a reproduction region setting instruction processing section 424; and a read data transfer instruction processing section 425. The structure of the recording control section 430 and the reproduction control section 440 is the same as the structure of their counterparts in the information recording/reproduction system 400 according to Example 1 of the present invention, and the descriptions thereof are omitted.

Figure 16:
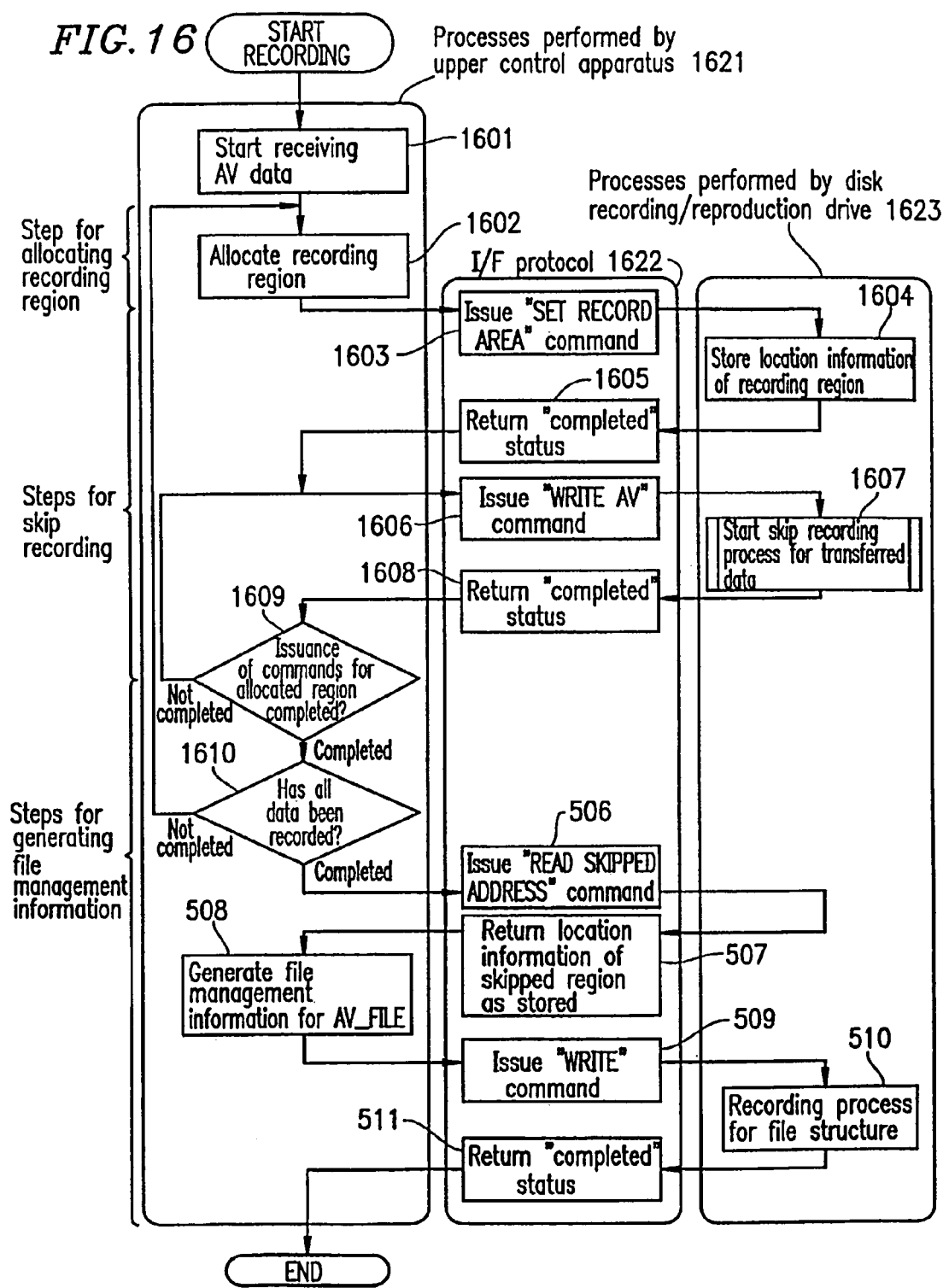
FIG. 16 is a block diagram illustrating an AV data recording method using an information recording/reproduction system according to Example 2 of the present invention.
Figure 17:
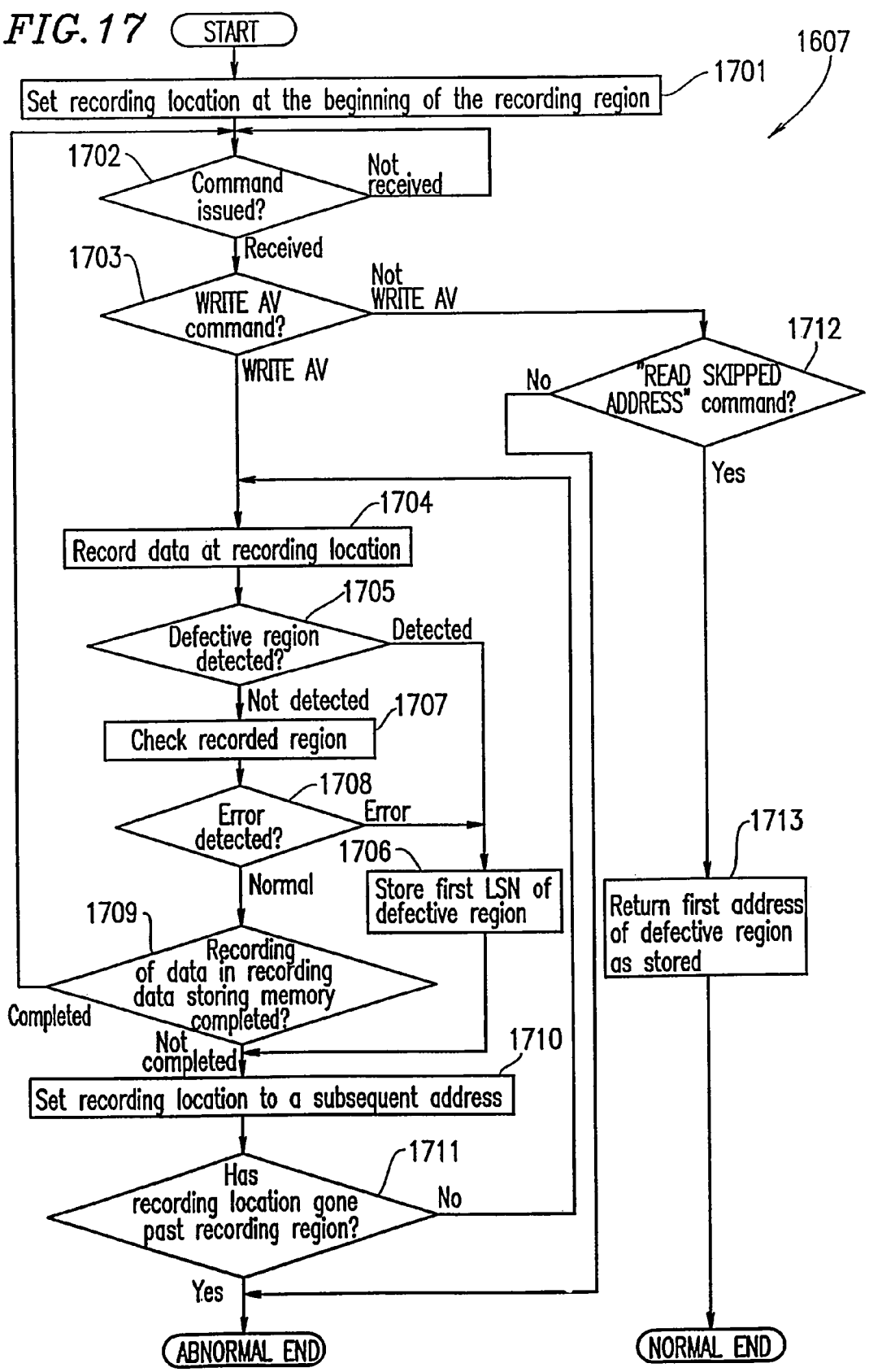
FIG. 17 is a flowchart illustrating a recording method by a disk recording/reproduction drive according to Example 2 of the present invention.

Next, a recording method for recording a file containing AV data by using the information recording/reproduction system 1500 illustrated in FIG. 15 will be described with reference to an overall control process shown in FIG. 16. The description of the overall control procedure will occasionally divert to the block diagram of FIG. 15 showing the information recording/reproduction system 1500, a flowchart of FIG. 17 showing a reproduction process, and data structure diagrams of FIGS. 18 and 19 showing I/F commands. In the overall control process shown in FIG. 16, it is assumed that the file management information for the file recorded on a rewritable disk was previously read at the time of insertion of the disk and interpreted by the file management information interpretation section 413, and that the file management information is retained in the upper control apparatus 1510. The overall control process shown in FIG. 16 includes a group of processes 1621 to be performed by the upper control apparatus 1510, a group of processes 1623 to be performed by the disk recording/reproduction drive 1520, and flows 1622 of instructions, data, process results in an instruction protocol between the upper control apparatus 1510 and the disk recording/reproduction drive 1520.

(Step 1601) Upon detecting an input signal, the AV data input section 470 begins receiving AV data. The AV data input section 470 converts the received analog video/audio signals into digital AV data, and transfers the digital AV data to the data buffer memory 414 in the upper control apparatus 1510.

(Step 1602) Prior to recording the AV data, the recording region allocation section 411 in the upper control apparatus 1510 obtains vacant region information concerning the rewritable disk from the file management information interpretation section 413, and allocates a recording region for recording an AV file. The recording region allocation section 411 allocates a recording region for the AV file by considering the size of the allocated regions and the physical distance between regions so as to attain a sufficient reading rate during reproduction. Since defective regions may exist within the recording region, and such defective regions will be skipped, the recording region allocation section 411 allocates a recording region which is larger than the actual recording size.

(Step 1603) The recording region designation instruction issuing section 1512 in the upper control apparatus 1510 issues to the disk recording/reproduction drive 1520 a "SET RECORD AREA" command, which designates a recording region, thereby designating the location information of the recording region which was allocated at Step 1602. FIG. 18 shows command control block data structure 1800 of the "SET RECORD AREA" command. The command control block of the "SET RECORD AREA" command consists of 12 bytes. A unique instruction code 1801 which identifies a "SET RECORD AREA" command is designated in byte 0. The LSN 1802 of the start sector of the recording region is represented by the four bytes from byte 2 to byte 5. The LSN 1803 of the end sector of the recording region is represented by the four bytes from byte 6 to byte 9. Thus, the "SET RECORD AREA" command designates the region between the start LSN and the end LSN of the recording region as a recording region.

(Step 1604) The recording region designation instruction processing section 1522 in the disk recording/reproduction drive 1520 receives the "SET RECORD AREA" command which was issued from the upper control apparatus 1510 at Step 1603, and stores the location information of the recording region in the recording control information memory 435.

(Step 1605) The recording region designation instruction processing section 1522 in the disk recording/reproduction drive 1520 returns a "completed" status to the upper control apparatus 1510 to indicate that the instruction has been processed.

(Step 1606) The split recording instruction issuing section 1513 in the upper control apparatus 1510 issues a "WRITE AV" command, which is an instruction for transferring the data to be recorded in the recording region as allocated at Step 1602 in a split form, and requesting recording of the data on the rewritable disk. After transferring the command control block of this command, the split recording instruction issuing section 1513 transfers the designated size of data. FIG. 19 shows the data structure 1900 of the command control block of the "WRITE AV" command, which is a split recording instruction. The command control block of the "WRITE AV" command consists of 12 bytes. A unique code 1901 which identifies a "WRITE AV" command is designated in byte 0. The transfer length 1902 is designated (in sectors) in the two bytes from byte 7 to byte 8. Since the "WRITE AV" command is a command which requests recording data in the region which has already been designated by the "SET RECORD AREA" command, the "WRITE AV" command includes no parameters for designating any region in which to perform recording.

(Step 1607) Referring back to FIG. 16, the split recording instruction processing section 1523 in the disk recording/reproduction drive 1520 receives recording data of the size as designated by the split recording command "WRITE AV", and stores the data in the recording data storing memory 436. Thereafter, the split recording instruction processing section 1523 informs the skip recording control section 432 in the recording control section 430 of the receipt of the recording request, and requests a skip recording operation to be begun. The process which is performed by the disk recording/reproduction drive 1520 will be described with reference to FIG. 17 in more detail.

(Step 1608) After instructing the skip recording control section 432 to begin recording, the split recording instruction processing section 1523 returns a "completed" status to the split recording instruction issuing section 1513 to indicate that the process has been completed.

(Step 1609) After completion of the "WRITE AV" command, the split recording instruction issuing section 1513 in the upper control apparatus 1510 determines whether or not all of the data to be recorded in the recording region as designated at Step 1602 has been transferred. If less than all of the data to be recorded has been transferred, the process goes back to Step 1606 to issue the split recording instruction "WRITE AV" command again. On the other hand, if it is determined that all of the data to be recorded has been transferred, the split recording process is terminated, and the process branches out to Step 1610.

(Step 1610) The upper control apparatus 1510 determines whether or not all of the AV data that was input from the AV data input section 470 has been recorded. If less than all of the data to be recorded has been recorded, the process goes back to Step 1602 to again allocate a new recording region. On the other hand, if it is determined that all of the data in the file has been recorded, the process branches out to Step 506 to enter a file management information generation process.

Figure 5:
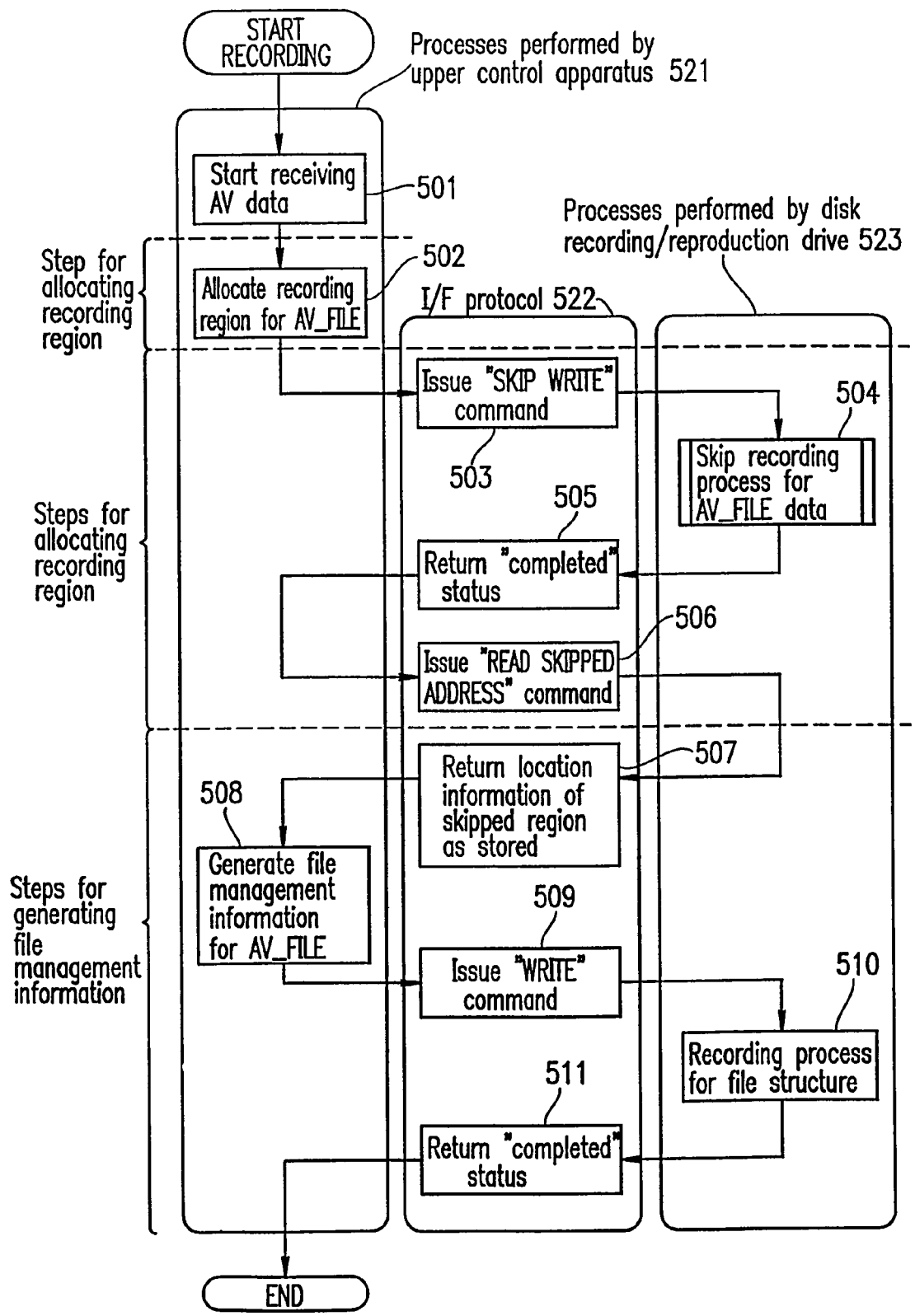
FIG. 5 is a block diagram illustrating an AV data recording method using an information recording/reproduction system according to Example 1 of the present invention.

Steps 506 to 511 are similar to those which have been illustrated in FIG. 5 with reference to Example 1. Therefore, the descriptions thereof are omitted.

Next, the skip recording process and the split recording process by the disk recording/reproduction drive 1520 will be described with reference to the flowchart of FIG. 17. It is assumed that the "SET RECORD AREA" command (which designates a recording region) has already been received by the disk recording/reproduction drive 1520 and stored in the recording control information memory 435.

(Step 1701) The skip recording control section 432 refers to the location information of the recording region which is stored in the recording control information memory 435, and sets a recording location at the beginning of the recording region.

(Step 1702) The instruction processing section 1521 in the disk recording/reproduction drive 1520 waits for a command to be issued from the upper control apparatus 1510.

(Step 1703) Having received the "WRITE AV" command, which is an instruction for transferring the recording data in a split form, the split recording instruction processing section 1523 apparatus 1510 stores the received recording data in the recording data storing memory 436, and requests the skip recording control section 432 to record the data.

(Step 1704) Having received the data recording request, the skip recording control section 432 begins to record the data which is stored in the recording data storing memory 436, starting from the recording location on a rewritable disk.

(Step 1705) The defective region detection section 431 determines a defective region if the address which is assigned to each sector as location information on the rewritable disk has not been properly read, or if the monitored amplitude of the amount of light which is reflected from the rewritable disk during recording appears disturbed. If the defective region detection section 431 determines a defective region, the process branches out to Step 1706.

(Step 1706) If it is informed by the defective region detection section 431 that a defective region has been detected, the skip recording control section 432 stores the first LSN of the defective region in the recording location storing memory 433 so that a recorded region can be distinguished from a skipped region after the recording.

(Step 1707) If no defective region was detected by the defective region detection section 431 during recording, the data verification section 434 performs a verification by reading the recorded data, and the data which has been read is subjected to an error correction process. If error correction is impossible or if the number of corrections exceeds a predetermined value, the region is determined as a defective region and the process branches out to Step 1706.

(Step 1708) The region in which an error was detected by the data verification section 434 is treated as a defective region at Step 1706. If no error is detected, it is determined that the data has been properly recorded.

(Step 1709) If the recording has properly ended, the defective region detection section 431 determines whether or not any data is left in the recording data storing memory 436 that has not been recorded yet. If it is determined that all data has been recorded, the defective region detection section 431 branches out to Step 1702 to enter a command wait state for waiting a command from the upper control apparatus 1510. On the other hand, if any data is left unrecorded, the process branches out to Step 1710.

(Step 1710) In order to allow the unrecorded data to be recorded, the defective region detection section 431 sets the recording location to a location which lies next to the location in which recording has been completed.

(Step 1711) The defective region detection section 431 compares the recording location which was set at Step 1710 against the last LSN of the recording region which is stored in the recording control information memory 435. If it is determined as a result of the comparison that the recording location has gone past the last LSN, the process is abnormally-ended, indicating that the recording was not successfully performed within the designated region. On the other hand, if it is determined that the recording location has not gone past the last LSN, the process goes back to Step 1704 to record the remaining data, starting from the recording location.

(Step 1712) The instruction processing section 1521 determines whether or not the instruction which was received during the command wait state at Step 1703 is a "READ SKIPPED ADDRESS" command, which is a recording location requesting instruction. If the received command is not a "READ SKIPPED ADDRESS" command, the instruction processing section 1521 determines that an inappropriate command was issued during the split recording process, and returns an error to the upper control apparatus 1510 and terminates the process. On the other hand, if it is determined that the recording location requesting instruction processing section 423 received a "READ SKIPPED ADDRESS" command, the process branches out to Step 1713.

(Step 1713) Having detected that the "READ SKIPPED ADDRESS" command has been received, the recording location requesting instruction processing section 423 returns to the upper control apparatus 1510 the location information of the skipped region which was stored in the recording location storing memory 433 during the skip recording process. Since the returned location information of the skipped region has the same data structure as that shown in FIG. 7 (described in Example 1), the description thereof is omitted. Having received this command, the disk recording/reproduction drive 1520 determines that the split recording process has been completed, and terminates the recording process.

Thus, the information recording method according to Example 2 of the present invention has been described above.

The information reproduction method which is performed by the information recording/reproduction system 1500 according to the present example is similar to that described in Example 1, and the description thereof is omitted.

As described above, in accordance with the information recording method according to the present invention, the following advantages are provided in addition to the advantage of the information recording method according to Example 1.

A recording region is previously set, and thereafter recording is performed in a split manner. As a result, it is possible to record AV data even in embodiments where the data buffer memory 414 in the information recording/reproduction system has a small capacity relative to a large recording region. By repetitively executing split recording instructions, it becomes unnecessary to occupy the I/O bus 480 between the upper control apparatus 1510 and the disk recording/reproduction drive 1520 for a long period of time. This advantage allows for applications which require access to the magnetic disk apparatus 450.

In accordance with the information recording method according to the present example of the invention, a region is designated based on its start LSN and end LSN by the reproduction region setting instruction. However, the designation may alternatively be based on a start LSN and a region length, for example, so long as a region can be identified.

In accordance with the information recording method according to the present example of the invention, the split recording instruction processing section 1523 is illustrated as returning a "completed" status to the upper control apparatus 1510 after the recording in a region on the rewritable disk which is requested of a split recording has been completed.

Alternatively, the split recording instruction processing section 1523 may return a "completed" status when the recording data is stored in the recording data storing memory 436, and the actual recording onto the rewritable disk may take place later.

Although the recording data is illustrated as being checked by the data verification section 434 in the information recording method according to the present example of the invention, it will be appreciated that such data verification may be omitted during recording in applications where higher real-time capabilities are required, e.g., where AV data is input at a very high transfer rate.

In accordance with the information recording method according to the present example of the invention, the defective regions which are detected during skip recording are registered as skipped and unused regions in the file management information. Alternatively, the disk recording/reproduction drive 1520 may register such defective regions on the SDL without allocating any spare regions therefor, and subsequently perform the allocation of an replacement location and the replacement process at the time of the next PC data recording.

In accordance with the information recording method according to the present example of the invention, the defective regions which are detected at the time of recording are skipped. However, it will be appreciated that all of the defective regions which have already been detected and registered on the SDL may also be skipped.

In accordance with the information recording/reproduction system 1500 according to the present example, the transfer of information between the upper control apparatus 1510 and the disk recording/reproduction drive 1520 is achieved based on the recording location requesting instruction, the reproduction region setting instruction, and the like. However, in embodiments where the upper control apparatus 1510 and the disk recording/reproduction drive 1520 of the system share a common memory region, etc., which is accessible to both the upper control apparatus 1510 and the disk recording/reproduction drive 1520, similar processes can be realized by performing writing/reading for such a memory region, thereby obviating the aforementioned instructions.

Example 3

Next, with reference to the figures, an information recording/reproduction system 3000 according to Example 3 of the present invention for recording or reproducing data on the disk medium shown in FIG. 1 will be described, with respect to its structure and operations.

Figure 20:
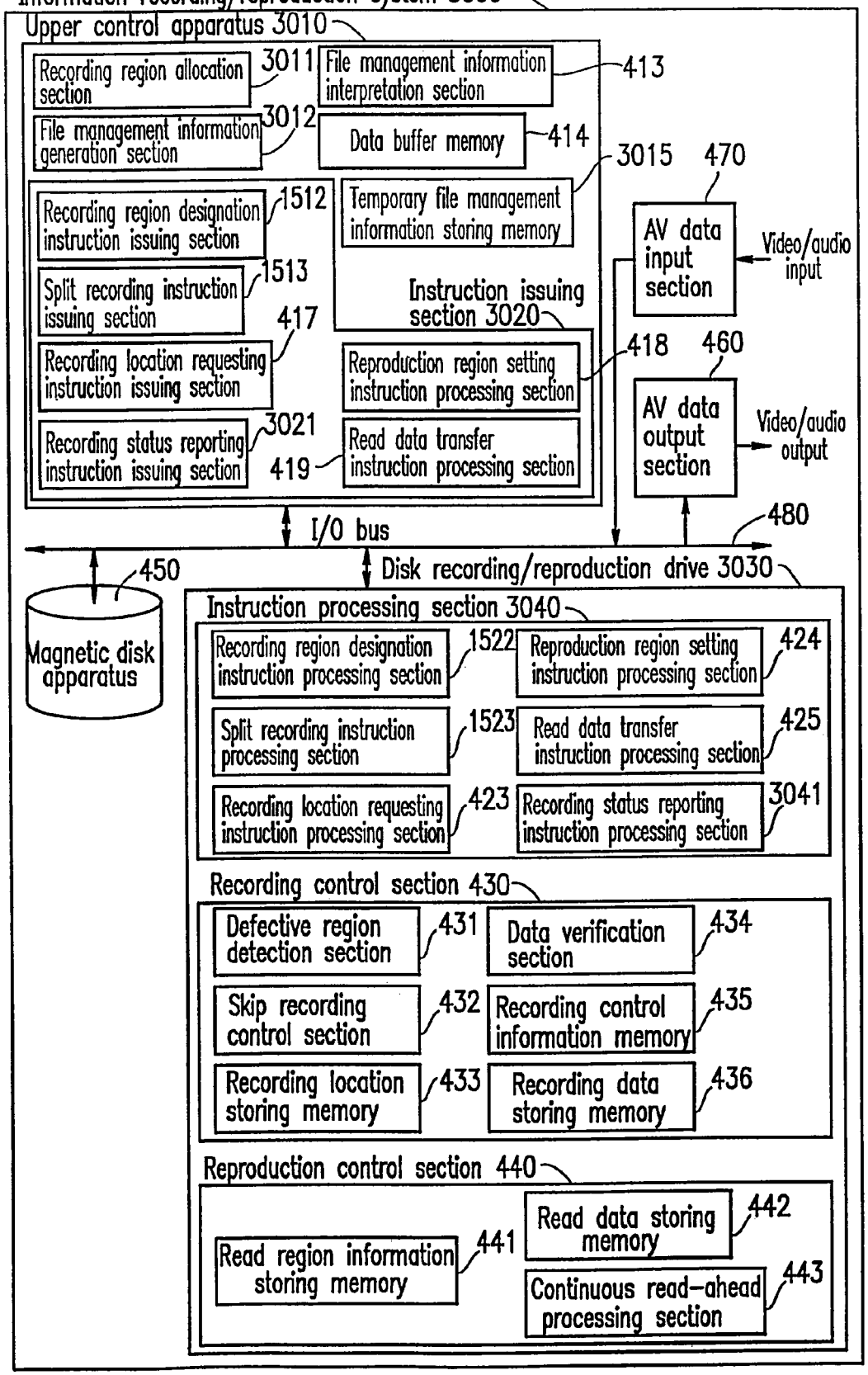
FIG. 20 is a block diagram illustrating an information recording/reproduction system according to Example 3 of the present invention.

FIG. 20 is a block diagram illustrating the structure of the information recording/reproduction system 3000 according to Example 3 of the present invention. Hereinafter, the respective elements of the information recording/reproduction system 3000 will be described. The descriptions of those elements which have their counterparts in the information recording/reproduction system 400 shown in FIG. 4 will be omitted.

As shown in FIG. 20, the information recording/reproduction system 3000 includes an upper control apparatus 3010, a disk recording/reproduction drive 3030, a magnetic disk apparatus 450, an AV data output section 460, an AV data input section 470, and an IO/bus 480.

The upper control apparatus 3010 is composed essentially of a microprocessor including a control program and memories for calculation purposes. The upper control apparatus 3010 includes a recording region allocation section 3011, a file management information generation section 3012, a file management information interpretation section 413, a data buffer memory 414, a temporary file management information storing memory 3015 which is composed essentially of a non-volatile memory; and an instruction issuing section 3020 for issuing instructions to the disk recording/reproduction drive 3030.

The instruction issuing section 3020 includes: a recording region designation instruction issuing section 1512 for issuing a recording region designation instruction which designates a recording region prior to a recording operation; a split recording instruction issuing section 1513 for issuing a split recording instruction for making a recording request for a recording region and performing a data transfer in a split manner; a recording location requesting instruction issuing section 417 for issuing a recording location requesting instruction which requests returning of the location information of a location in which a file has been recorded after recording; a reproduction region setting instruction issuing section 418 for issuing a reproduction region setting instruction which designates a region to be reproduced prior to a reproduction operation; a read data transfer instruction issuing section 419 for issuing a read data transfer instruction which requests the transfer of data which has been read; and a recording status reporting instruction issuing section 3021 for issuing a recording status reporting instruction which requests reporting of a recording status during recording.

The disk recording/reproduction drive 3030 includes: an instruction processing section 3040 for receiving and processing instructions from the upper control apparatus 3010; a recording control section 430 for controlling the recording onto a rewritable disk (not shown); and a reproduction control section 440 for controlling the reproduction from the rewritable disk.

The instruction processing section 3040 includes: a recording region designation instruction processing section 1522 for receiving and processing a recording region designation instruction; a split recording instruction processing section 1523 for receiving and processing a split recording instruction; a recording location requesting instruction processing section 423; a reproduction region setting instruction processing section 424; a read data transfer instruction processing section 425; and a recording status reporting instruction processing section 3041 for receiving a recording status reporting instruction and performing a recording status reporting process. The structure of the recording control section 430 and the reproduction control section 440 is the same as the structure of their counterparts in the information recording/reproduction system 400 according to Example 1 of the present invention, and the descriptions thereof are omitted.

Next, a recording method according to Example 3 of the present invention will be described with reference to FIGS. 21A and 21B. Later, the details of the recording method will also be described with reference to FIG. 22.

Figures 21A, 21B:
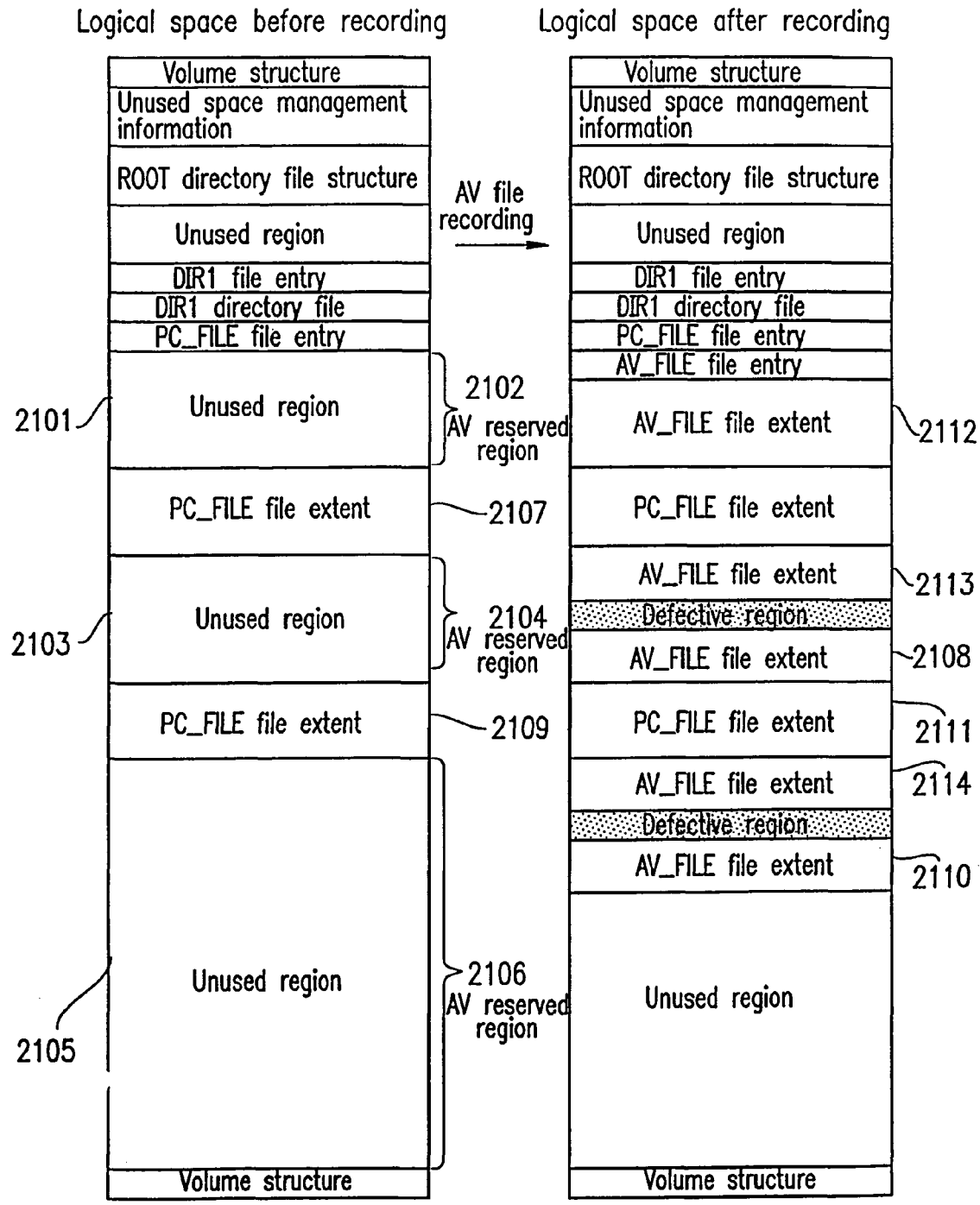
FIGS. 21A and 21B are data structure diagrams illustrating data layouts on a rewritable disk according to Example 3 of the present invention.

FIGS. 21A and 21B show data layouts of the logical space of a rewritable disk according to the present example. FIG. 21A illustrates a data layout of the logical space before any AV files are recorded, where one PC file is present under a directory DIR1. The volume structure, ROOT directory file structure, DIR1 file entry, DIR1 directory file, and PC_FILE file entry respectively are identical with their counterparts described with reference to FIGS. 1, 2, 3. Therefore, the descriptions thereof are omitted. FIG. 21B illustrates a data layout of the logical space where an AV file has been recorded in unused regions which were available in the logical space before recording.

Prior to recording, the upper control apparatus 3010 reserves at least one of unused regions in the logical space for use as a recording region for AV files. A portion of an unused region 2101 shown in FIG. 21A is reserved as an AV reserved region 2102 (While the portion of the unused region that is not used as the AV reserved region 2102 is reserved as a region for recording a file entry, i.e., file management information for AV files); an unused region 2103 is reserved as an AV reserved region 2104; and an unused region 2105 is reserved as an AV reserved region 2106. Prior to performing a recording operation, the upper control apparatus 3010 designates the three AV reserved regions 2102, 2104, and 2106 as recording regions to the disk recording/reproduction drive 3030. Thereafter, the upper control apparatus 3010 issues a split recording instruction, and transfers recording data to the disk recording/reproduction drive 3030. The upper control apparatus 3010 repetitively issues split recording instructions until all of the recording data has been transferred.

The disk recording/reproduction drive 3030 receives the recording data which has been transferred in accordance with the split recording instructions, and begins to record the data in the regions which have previously been designated as recording regions. At this time, the recording regions are sequentially used, following the order of designation by the upper control apparatus 3010. In the example illustrated in FIG. 21, the recording starts from the beginning of the AV reserved region 2102, which was the first-designated AV reserved region.

If the disk recording/reproduction drive 3030 uses up a whole recording region during the recording of the recording data which was transferred from the upper control apparatus 3010 in accordance with a split recording instruction, the disk recording/reproduction drive 3030 will automatically continue to perform a recording operation for the next designated recording region. In the example illustrated in FIG. 21, after completing recording to the AV reserved region 2102, the disk recording/reproduction drive 3030 begins recording to the AV reserved region 2104, automatically avoiding a PC_FILE extent 2107. The disk recording/reproduction drive 3030 skips a defective region 3100 which was detected during recording, and records the recording data which would otherwise have been recorded in the defective region 3100 in a subsequent region.

If any recording data is left after having completed recording to the entire AV reserved region 2104, the disk recording/reproduction drive 3030 skips a PC_FILE extent 2109, and performs recording for the AV reserved region 2106. Just like the defective region 3100 was skipped, a defective region 3101 in the AV reserved region 2106 is also skipped, so that the recording data is recorded in a subsequent region. After the recording of all recording data is completed in the aforementioned manner, the upper control apparatus 3010 registers each continuous region, among all the regions in which AV data has been recorded, as an "extent". The upper control apparatus 3010 generates file entry information such that the respective AV data recording regions, as separated by the PC_FILE extents and the defective regions, are designated as AV_FILE extents 2112, 2113, 2108, 2114, and 2110. The upper control apparatus 3010 generates an AV_FILE file entry, which is recorded in the AV reserved region 2102 (which was reserved within the unused region 2101).

Next, referring to FIG. 22, the aforementioned recording procedure described with reference to FIG. 21 will be described in more detail.

(Step 3201) Upon detecting an input signal, the AV data input section 470 begins receiving AV data. The AV data input section 470 converts the received analog video/audio signals into digital AV data, and transfers the digital AV data to the data buffer memory 414 in the upper control apparatus 3010.

(Step 3202) Prior to recording the AV data, the recording region allocation section 3011 in the upper control apparatus 3010 obtains vacant region information concerning the rewritable disk from the file management information interpretation section 413, and allocates a recording region for recording an AV file. The recording region allocation section 3011 allocates a recording region for the AV file by considering the size of the allocated regions and the physical distance between regions so as to attain a sufficient reading rate during reproduction. The recording region allocation section 3011 allocates a plurality of continuous regions as recording regions. In the example illustrated in FIG. 21, AV reserved regions 2102, 2104, and 2106 are allocated as recording regions.

(Steps 3203 to 3205) The recording region designation instruction issuing section 1512 in the upper control apparatus 3010 issues to the disk recording/reproduction drive 3030 a "SET RECORD AREA" command, which designates a recording region, so as to designate the location information of the recording regions which were allocated at Step 3202 following the order in which they were allocated. (The "SET RECORD AREA" command has already been described with reference to FIG. 18.) The recording region designation instruction processing section 1522 in the disk recording/reproduction drive 3030 receives the "SET RECORD AREA" command which was issued from the upper control apparatus 3010, and stores the location information of the recording region in the recording control information memory 435. The start LSN and the end LSN of the respective regions, following the order of the received recording regions, are stored in the location information of each recording region. In a subsequent recording operation, the recording regions will be used in the order of this storage.

(Step 3206) The split recording instruction issuing section 1513 in the upper control apparatus 3010 issues a "WRITE AV" command. The "WRITE AV" command is an instruction which transfers the data to be recorded in the recording regions as allocated at Step 3202 in a split form and requests recording of the data on the rewritable disk. (This command has already been described with reference to FIG. 19.) Having received the "WRITE AV" command, the split recording instruction processing section 1523 in the disk recording/reproduction drive 3030 stores recording data of the size as designated by its control block in the recording data storing memory 436. Thereafter, the split recording instruction processing section 1523 returns a "completed" status to the upper control apparatus 3010. The received data is recorded after the returning of the "completed" status. Such an operation is usually referred to as a "write-back cache" operation.

(Step 3207) The recording location requesting instruction processing section 423 in the upper control apparatus 3010 issues a "READ SKIPPED ADDRESS" command in order to obtain the recording locations within the portion which has actually been recorded on the rewritable disk. (This command has already been described with reference to FIGS. 7 and 8.) The recording location requesting instruction processing section 423 in the disk recording/reproduction drive 3030 refers to the skipped address information which is stored in the recording location storing memory 433, and returns any unreported skipped address information to the upper control apparatus 3010. Since any skipped address information that has already been returned is set to a "reported" status on the recording location storing memory 433, such skipped address information will no longer be returned responsive to any subsequent instances of the "READ SKIPPED ADDRESS" command.

(Step 3208) The recording status reporting instruction issuing section 3021 in the upper control apparatus 3010 issues a "SEND RECORDING STATUS" command to request reporting of the a current recording status.

Figure 23:
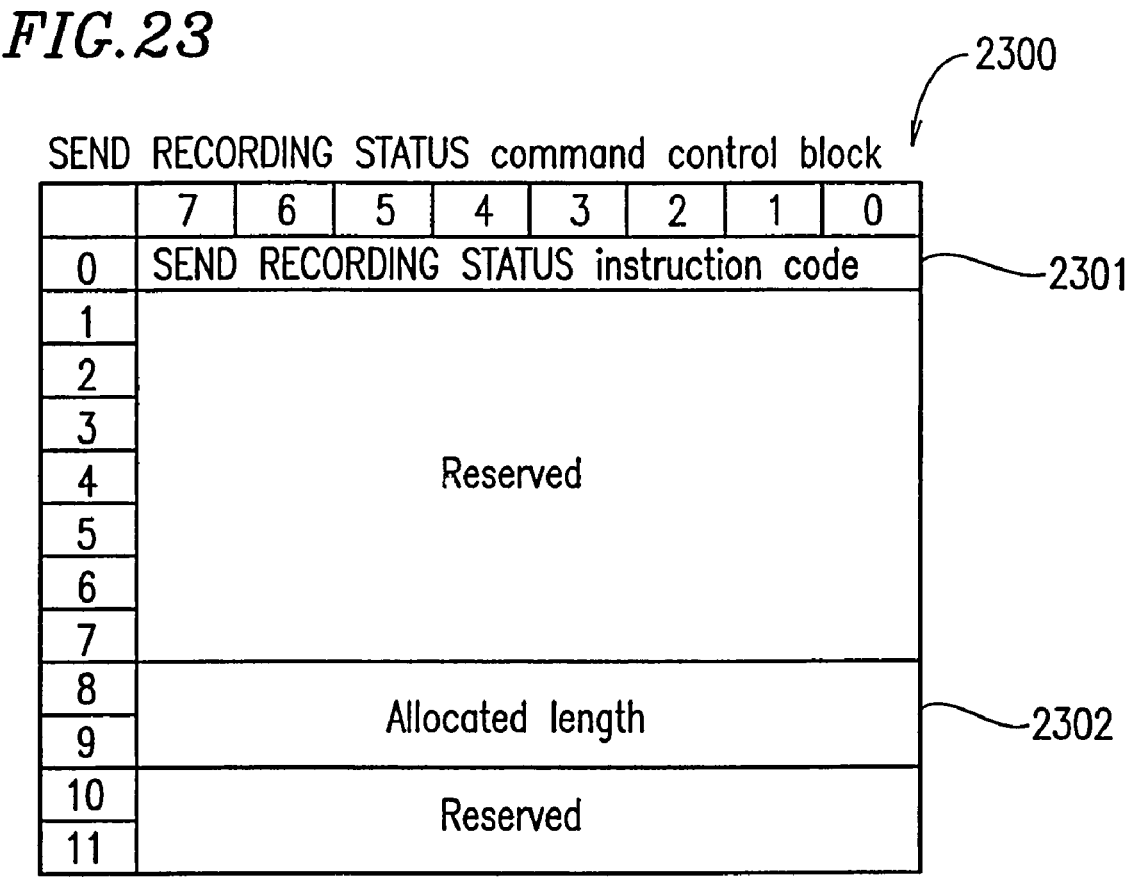
FIG. 23 is a data structure diagram illustrating a command control block of a "SEND RECORDING STATUS" command according to Example 3 of the present invention.

A data structure 2300 of the command control block of the "SEND RECORDING STATUS" command is shown in FIG. 23. A unique code 1901 which identifies a "SEND RECORDING STATUS" command is designated in byte 0, i.e., a "SEND RECORDING STATUS" instruction code region 2301. Bytes Ito 7 are reserved for possible future extensions of instruction definition or the like. In an "allocated length" field 2302, a memory size which was allocated by the upper control apparatus 3010 for the "RECORDING STATUS" data which is to be returned responsive to the "SEND RECORDING STATUS" command. If the allocated length 2302 is smaller than "16", the disk recording/reproduction drive 3030 returns an amount of data equivalent to the allocated length 2302. Bytes 10 to 11 are reserved.

Having received the "SEND RECORDING STATUS" command, the recording status reporting instruction processing section 3041 in the disk recording/reproduction drive 3030 receives a current recording status from the skip recording control section 432 in the recording control section 430, generates "RECORDING STATUS" data, and returns the generated "RECORDING STATUS" data to the upper control apparatus 3010.

Figure 24:
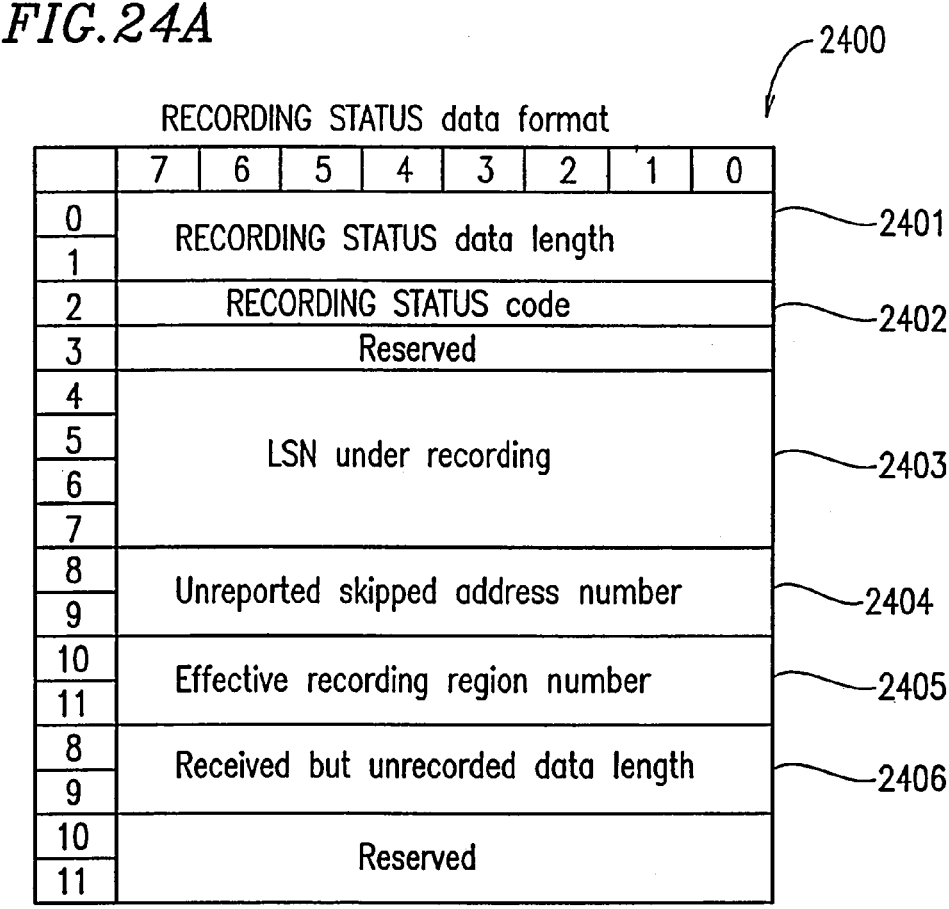
FIG. 24A is a data structure diagram illustrating a "RECORDING STATUS" data format according to Example 3 of the present invention.
FIG. 24B is a table illustrating the code definitions of a "RECORDING STATUS" data format according to Example 3 of the present invention.
Figure 25:
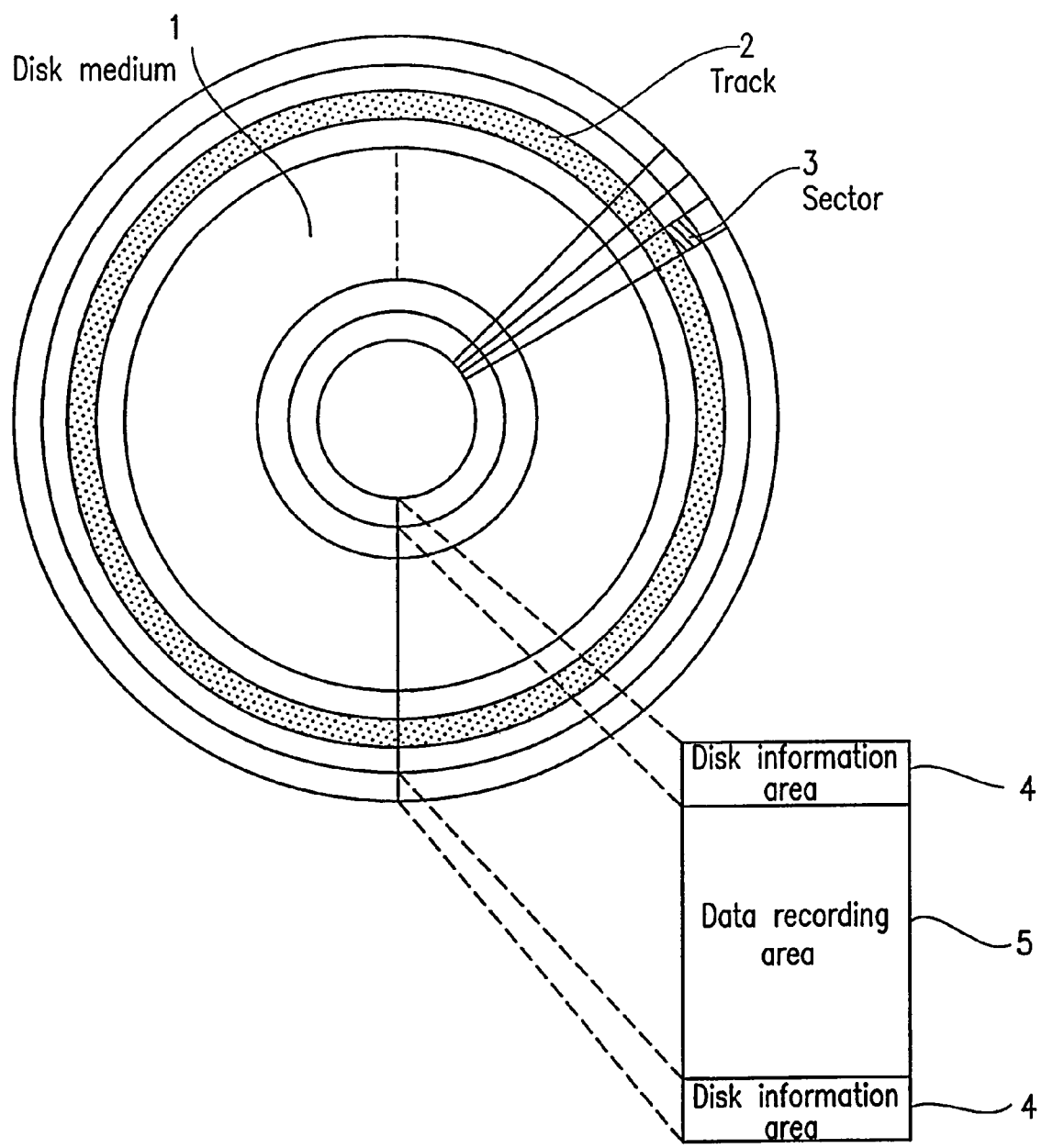
FIG. 25 is a schematic diagram illustrating the structure a general disk medium.

A data structure 2400 of the "RECORDING STATUS" data is shown in FIG. 24A. In bytes 0 to 1, a data length 2401 of the "RECORDING STATUS" data is stored. Since the data length 2401 does not include the length of the "RECORDING STATUS" data length field itself, "14 (bytes)" is set in the data length 2401. A "RECORDING STATUS" data code field 2402 stores a current recording status as a one-byte code as shown in FIG. 24B. As shown in FIG. 24B, "00h" in the field 2402 indicates that all the recording regions have been used (or no recording regions are set); "01h" in the field 2402 indicates that a recording region has been set but no data to record exists; "02h" in the field 2402 indicates that a recording operation is being executed.

A "LSN under recording" field 2403, spanning from byte 4 to byte 7 of the "RECORDING STATUS" data format shown in FIG. 24A, stores a LSN which is currently under recording. This field enables the upper control apparatus 3010 to confirm the progress of recording. An "Unreported skipped address number" field 2404 from byte 8 to byte 9 stores the number of skipped addresses which have not been reported to the upper control apparatus 3010, among the blocks which were skipped due to defective regions. An "Effective recording region number" field 2405 from byte 10 to byte 11 stores the number of effective regions, among the regions which were designated by the upper control apparatus 3010 in accordance with the "SET RECORD AREA" command. For example, in the case where three recording regions are designated, if data recording has been performed for the first recording region and part of the way into the second recording region, then "2" (indicating, the second and third recording regions) is set in the field 2405. In a "Received but unrecorded data length" field 2406 from byte 12 to byte 13, the size of data which has been transferred from the upper control apparatus 3010 in accordance with the "WRITE AV" command, but which has not been recorded, is set in multiples of 2048 bytes.

(Step 3209) The file management information generation section 3012 in the upper control apparatus 3010 generates file management information based on the recording information which was obtained at Steps 3207 and 3208 up to that point in time, and stores the generated file management information in the temporary file management information storing memory 3015.

(Step 3210) The split recording instruction issuing section 1513 in the upper control apparatus 3010 determines whether or not all of the AV data that is stored in the data buffer memory 414 has been recorded. If it is determined that any data is left untransferred, the process goes back to Step 3206 to again issue the "WRITE AV" command. On the other hand, if it is determined that all of the data to be recorded has been transferred, the process branches out to Step 3211.

(Step 3211) The file management information generation section 3012 in the upper control apparatus 3010 refers to the "RECORDING STATUS" data which was obtained at Step 3208, in order to determine whether the recording status is a "No recording data" status or not. If a "No recording data" status is determined, the process branches to Step 3212 to update and finalize the file management information for AV files. On the other hand, if a status other than the "No recording" status is determined, the process goes back to Step 3207 to wait for a "No recording data" status.

(Step 3212) The file management information generation section 3012 in the upper control apparatus 3010 generates file entry information for the AV files which have been recorded, and generates management information (e.g., unused space management information), and requests the disk recording/reproduction drive 3030 to perform a recording process in accordance with a usual "WRITE" command.

Thus, the recording procedure for AV data has been described above.

The information reproduction method which is performed by the information recording/reproduction system 3000 according to the present example is similar to that described in Example 1, and the description thereof is omitted.

In accordance with the information recording method according to the present example of the invention, Step 3209 confirms a current recording status and stores file management information in the temporary file management information storing memory 3015. As a result, in the event of a power failure during the recording of AV data, it is possible to restore the file management information that had been generated up to the portion which was actually recorded on the rewritable disk.

In accordance with the information recording method according to the present example of the invention, a region is designated based on its start LSN and end LSN by the reproduction region setting instruction. However, the designation may alternatively be based on a start LSN and a region length, for example, so long as a region can be identified.

In accordance with the information recording method according to the present example of the invention, the defective regions which are detected at the time of recording are skipped. However, it will be appreciated that all of the defective regions which have already been detected and registered on the SDL may also be skipped.

In accordance with the information recording method according to the present example of the invention, the "READ SKIPPED ADDRESS" command and the "SEND RECORDING STATUS" command are illustrated as being separately defined. Alternatively, these commands may be arranged so that the data to be returned responsive to these commands may be returned in a combined form, responsive to one command.

In accordance with the information recording method according to the present example of the invention, Steps 3207 to 3209 are performed each time the "WRITE AV" command is issued. It will be appreciated, however, that these processes only need to occur within a predetermined period.

In accordance with the information recording method according to the present example of the invention, the file management information is updated at Step 3209. Alternatively, similar effects can be attained by updating files for management information associated with so-called "trick play" modes, for example.

In accordance with the information recording disk according to the present invention, it is possible to perform recording/reproduction by skipping a defective region in a logical space which is managed based on file management information. As a result, the present invention makes possible a high-speed defect management which involves simply skipping defective regions, whereas a conventional defect management method would require replacement processes for providing an error-free logical space and therefore incur some delay.

In embodiments where the information recording disk includes ECC blocks, each consisting of a plurality of sectors, the information recording disk according to the present invention attains excellent reliability as an information recording disk by registering defective regions on an ECC block-by-ECC block basis.

In embodiments where the information recording disk includes ECC blocks, each consisting of a plurality of sectors, the information recording disk according to the present invention provides for excellent reliability of PC data even if both AV data (which may be recorded without performing a data verification process because of their high real-time recording capability requirements) and PC data (which require high reliability) are present on the same disk. This can be realized by registering a padding extent for ensuring that an ECC block in which AV data is recorded does not include any PC data, and by providing identification information for every extent, which ensures that no ECC block will contain both AV data and PC data within the same block.

The information recording disk according to the present invention contains identification information for identifying an AV file from a non-AV file. As a result, it is possible to selectively employ different reproduction methods in accordance with the specific file attributes. For example, in the case of reproducing an AV file, it is possible to employ the relatively fast reproduction method according to the present invention.

As described above, in accordance with the information recording method according to the present invention, any defective regions which are detected at the time of recording are skipped during recording. As a result, the delay in the recording/reproduction process associated with the conventional replacement process is substantially eliminated, thereby enabling real-time recording/reproduction of AV data.

In accordance with the information recording method according to the present invention, defective regions are managed as unused regions by the file management information. This makes it possible to record PC data by using a conventional replacement method for the LSNs which are determined as defective regions.

In accordance with the information recording method according to the present invention, by performing a data verification process, it becomes possible to attain high reliability in applications where real-time capabilities are required not during recording but during reproduction, e.g., recording AV data which is already stored in a magnetic disk apparatus. Since an allowable number of skips is set during a skip recording process, even if a large number of defective regions are skipped, it is still possible to prevent the destruction of the subsequent regions in which other file data may be recorded.

If the end of an AV file extent happens to fall in the middle of an ECC block, the remainder of that ECC block is registered as a padding extent, thereby preventing other files from being recorded in the same ECC block. Accordingly, in embodiments where AV data are recorded without any data verification in order to facilitate real-time recording, it is still possible to prevent files containing AV data and files containing PC data from being mixed in the same ECC block. As a result, the reliability of PC data is ensured.

In accordance with the information recording method according to the present invention, identification information for identifying AV data from other types of data is registered in the file management information, so that it is possible, at the time of reproduction, to know whether or not the data requires real-time processing capabilities.

In accordance with the information recording method according to the present invention, a recording region is previously set, and thereafter recording is performed in a split manner. As a result, it is possible to record AV data even in embodiments where the information recording/reproduction system incorporates a data buffer memory which has a small capacity relative to a large recording region. By repetitively executing split recording instructions, it becomes unnecessary to occupy a bus between an upper control apparatus and a disk recording/reproduction drive for a long period of time. This advantage allows for applications which require access to the magnetic disk apparatus.

In accordance with the information recording method according to the present invention, by regularly updating and storing file management information in a non-volatile memory, it becomes possible to provide means for data restoration in the event of an unexpected power failure or the like, without unfavorably disrupting the AV data recording.

In accordance with the information recording method according to the present invention, one or more reproduction regions may be set prior to reproduction in order to realize a read-ahead process for previously reading a plurality of regions, thereby making for even faster reproduction. As a result, AV data reproduction can be performed so that video/audio information is smoothly reproduced without disruptions.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording medium for recording and reproducing data thereon on a sector-by-sector basis, comprising ECC blocks as units for performing an error correction process, each ECC block comprising a plurality of sectors, wherein at least one sector having data recorded therein is managed as an extent, and at least one extent is managed as a file, at least one file being managed by using a file structure, wherein the file structure comprises unused space management information for identifying a used region and an unused region, and wherein, in a case where data which is not large enough to fill one of the ECC blocks, a padding extent is recorded in the unused area of the ECC block, the padding extent is an extent which is already allocated and is showing to be an unused area, wherein a defect ECC block which is detected as to include a defect sector within recording of a real time data is skipped, the skipped defect ECC block is registered as an unused area in the unused space management information, the position information of the skipped defect ECC block is stored in a defect list, the real time data as to be recorded before in the skipped defect ECC block is recorded in the ECC block which is recordable next after the skipped defect ECC block, and wherein the defect sector is an area which cannot be reproduced for a suitable data which is already recorded on the information recording medium, and the extent can include one or more skipped ECC blocks.

2. A recording method for recording information on the information recording medium according to claim 1, wherein the recording method comprises the steps of registering the skipped defect block as a used region in the unused space management information, and storing the position information of the skipped defect ECC block into a defect list.

3. A reproducing method for reproducing information recorded on the information recording medium according to claim 1, the reproducing method comprises reproducing the recorded information based on the unused space management information.

* * * * *